United States Patent
Greaney et al.

(10) Patent No.: US 12,403,684 B2
(45) Date of Patent: Sep. 2, 2025

(54) AUTOMATED SYSTEM AND METHOD FOR FORMING A LAMINATED STRUCTURE

(71) Applicant: Taylor Made Golf Company, Inc., Carlsbad, CA (US)

(72) Inventors: Mark Greaney, Vista, CA (US); Todd Beach, San Diego, CA (US); Stephen Kraus, Kaohsiung (TW); Connie Hsiao, Kaohsiung (TW); Tyson Hsiao, Kaohsiung (TW); Pei-yao Lin, Kaohsiung (TW)

(73) Assignee: TAYLOR MADE GOLF COMPANY, INC., Carlsbad, CA (US)

( * ) Notice: Subject to any disclaimer, the term of this patent is extended or adjusted under 35 U.S.C. 154(b) by 0 days.

(21) Appl. No.: 18/645,873

(22) Filed: Apr. 25, 2024

(65) Prior Publication Data
US 2024/0343031 A1 Oct. 17, 2024

Related U.S. Application Data

(63) Continuation of application No. 18/179,848, filed on Mar. 7, 2023, now Pat. No. 11,999,149, which is a
(Continued)

(51) Int. Cl.
*B32B 41/00* (2006.01)
*B32B 37/02* (2006.01)
(Continued)

(52) U.S. Cl.
CPC ............ *B32B 38/105* (2013.01); *B32B 37/02* (2013.01); *B32B 37/14* (2013.01);
(Continued)

(58) Field of Classification Search
CPC ....... B32B 38/105; B32B 37/02; B32B 37/14; B32B 38/0036; B32B 41/00;
(Continued)

(56) References Cited

U.S. PATENT DOCUMENTS

| 8,012,039 B2 | 9/2011 | Greaney et al. |
| 10,881,916 B2 | 1/2021 | Greaney et al. |

(Continued)

FOREIGN PATENT DOCUMENTS

| CN | 112074562 | 12/2020 |
| JP | 3224026 | 11/2019 |

(Continued)

OTHER PUBLICATIONS

Office Action for Taiwan Patent Application No. 112106435 dated Jan. 8, 2024.
(Continued)

*Primary Examiner* — Michael N Orlando
*Assistant Examiner* — Joshel Rivera
(74) *Attorney, Agent, or Firm* — Kunzler Bean & Adamson

(57) ABSTRACT

A method of removing a backing layer from a panel, made of an uncured pre-impregnated fiber-reinforced polymer, comprises a step of orienting the panel into a backing-separation orientation relative to an edge-engagement tool. The method also comprises a step of positioning the panel into a backing-separation position relative to the edge-engagement tool. The method further comprises a step of moving the edge-engagement tool, when the panel is in the backing-separation orientation and the backing-separation position, so that backing-engagement features of the edge-engagement tool engage the backing layer, at only an edge portion of the backing layer, and just the edge portion of the backing layer separates from the panel. The method additionally comprises a step of gripping the edge portion of the backing layer, and, when gripped, moving the backing layer relative to the panel so that an entirety of the backing layer separates from the panel.

21 Claims, 22 Drawing Sheets

Related U.S. Application Data continuation of application No. 17/321,315, filed on May 14, 2021, now Pat. No. 11,633,947.

(51) Int. Cl.
*B32B 37/14* (2006.01)
*B32B 38/00* (2006.01)

(52) U.S. Cl.
CPC .......... *B32B 38/0036* (2013.01); *B32B 41/00* (2013.01); *B32B 2309/70* (2013.01)

(58) Field of Classification Search
CPC ... B32B 2309/70; B32B 43/006; B29C 70/54; B29C 43/02; B29C 43/32; B29C 43/52; B29L 2009/00
USPC .................... 156/60, 64, 350, 351, 378, 379

See application file for complete search history.

(56) References Cited

U.S. PATENT DOCUMENTS

| | | |
|---|---|---|
| 2011/0083800 A1 | 4/2011 | Chao |
| 2012/0199282 A1 | 8/2012 | Chao |
| 2012/0312481 A1 | 12/2012 | Hang et al. |
| 2014/0251546 A1 | 9/2014 | Deguchi et al. |
| 2014/0274446 A1 | 9/2014 | Greaney et al. |

FOREIGN PATENT DOCUMENTS

| | | |
|---|---|---|
| TW | 201447973 | 12/2014 |
| TW | 201600336 | 1/2016 |
| TW | 202138032 | 10/2021 |

OTHER PUBLICATIONS

U.S. Appl. No. 17/156,205, filed Jan. 22, 2021.
U.S. Appl. No. 18/172,834, filed Feb. 22, 2023.
Office Action for Taiwan Patent Application No. 110130896 dated Jan. 20, 2025.

AUTOMATED SYSTEM AND METHOD FOR FORMING A LAMINATED STRUCTURE

FIELD

This disclosure relates generally to forming laminated structures made of fiber-reinforced polymers, and more particularly to removing backing layers from panels made of fiber-reinforced polymers.

BACKGROUND

Laminated structures can be made from stacked plies of fiber-reinforced polymers. Commonly, each one of the stacked plies is made of an uncured pre-impregnated fiber-reinforced polymer. Uncured pre-impregnated fiber-reinforced polymers are used because they can be shaped into any of various shapes prior to curing. The stacked plies of uncured pre-impregnated fiber-reinforced polymer may have backing paper affixed to the plies to help prevent damage to or contamination of the uncured pre-impregnated fiber-reinforced polymer during transportation, storage, or handling of the plies. Before curing the plies, the backing paper is removed. However, removal of the backing paper in an efficient automated manner, without damaging the uncured pre-impregnated fiber-reinforced polymer, can be difficult due to the tackiness of the uncured pre-impregnated fiber-reinforced polymer and the thinness of the backing paper.

SUMMARY

The subject matter of the present application has been developed in response to the present state of the art, and in particular, in response to the shortcomings of methods of removing backing paper from plies of uncured pre-impregnated fiber-reinforced polymer, that have not yet been fully solved by currently available techniques. Accordingly, the subject matter of the present application has been developed to provide an automated system and associated method, for automatedly removing backing paper from plies of uncured pre-impregnated fiber-reinforced polymer, that overcome at least some of the above-discussed shortcomings of prior art techniques.

The following is a non-exhaustive list of examples, which may or may not be claimed, of the subject matter, disclosed herein.

Disclosed herein is a method of removing a backing layer from a panel, made of an uncured pre-impregnated fiber-reinforced polymer. The backing layer is secured to, via a tack force between the backing layer and the uncured pre-impregnated fiber-reinforced polymer, and flush against a broad surface of the panel. The method comprises a step of orienting the panel into a backing-separation orientation relative to an edge-engagement tool. The method also comprises a step of positioning the panel into a backing-separation position relative to the edge-engagement tool. The method further comprises a step of moving the edge-engagement tool, relative to the panel and when the panel is in the backing-separation orientation and the backing-separation position, so that backing-engagement features of the edge-engagement tool engage the backing layer, at only an edge portion of the backing layer, and just the edge portion of the backing layer separates from the panel. The method additionally comprises a step of gripping the edge portion of the backing layer, after the edge portion separates from the panel, and, when gripped, moving the backing layer relative to the panel so that an entirety of the backing layer separates from the panel. The preceding subject matter of this paragraph characterizes example 1 of the present disclosure.

The edge-engagement tool comprises a plate and the backing-engagement features comprise a plurality of protrusions protruding from the plate. The step of moving the edge-engagement tool comprises reciprocating the plate along a plane, angled at a plate angle relative to the panel and parallel with a leading edge of the edge portion, when the panel is oriented in the backing-separation orientation and positioned in the backing-separation position, so that only the plurality of protrusions of the plate engage only the edge portion of the backing layer when the plate moves along the plane. The preceding subject matter of this paragraph characterizes example 2 of the present disclosure, wherein example 2 also includes the subject matter according to example 1, above.

The plate reciprocates along the plane in a forward direction and a backward direction. The forward direction is opposite the backward direction. Each engagement between the plurality of protrusions and the edge portion of the backing layer results in an at least partial separation of the backing layer from the panel. The plurality of protrusions engage the edge portion when the plate moves in the forward direction. The plurality of protrusions do not substantially engage the edge portion when the plate moves in the backward direction such that the at least partial separation of the backing layer from the panel is maintained as the plate moves in the backward direction. The preceding subject matter of this paragraph characterizes example 3 of the present disclosure, wherein example 3 also includes the subject matter according to example 2, above.

Each one of the plurality of protrusions comprises a sharp side facing in the forward direction and a dull side facing in the backward direction. Engagement of the plurality of protrusions with the edge portion of the backing layer comprises the sharp side of the plurality of protrusions at least partially penetrating the edge portion of the backing layer. The preceding subject matter of this paragraph characterizes example 4 of the present disclosure, wherein example 4 also includes the subject matter according to example 3, above.

The plate angle is an oblique angle. The preceding subject matter of this paragraph characterizes example 5 of the present disclosure, wherein example 5 also includes the subject matter according to any one of examples 2-4, above.

The plate angle is an acute angle. The preceding subject matter of this paragraph characterizes example 6 of the present disclosure, wherein example 6 also includes the subject matter according to example 5, above.

Reciprocating the plate comprises reciprocating the plate at least two times, so that the plurality of protrusions of the plate engage only the edge portion of the backing layer at least two times. The preceding subject matter of this paragraph characterizes example 7 of the present disclosure, wherein example 7 also includes the subject matter according to any one of examples 2-6, above.

The edge-engagement tool comprises a wheel and the backing-engagement features comprise teeth spaced apart circumferentially about the wheel. The step of moving the edge-engagement tool comprises rotating the wheel, about an axis parallel with a leading edge of the edge portion of the backing layer, and, when rotating the wheel, translating the wheel, in a wheel direction that is parallel with the broad surface of the panel, when the panel is oriented in the backing-separation orientation and positioned in the backing-separation position, so that only the teeth of the wheel repeatedly engage the edge portion of the backing layer. The preceding subject matter of this paragraph characterizes example 8 of the present disclosure, wherein example 8 also includes the subject matter according to example 1, above.

The backing layer further comprises a second edge portion at an opposite end of the panel relative to the edge portion. The edge-engagement tool further comprises a second wheel and the backing-engagement features further comprise second teeth spaced apart circumferentially about the second wheel. The step of moving the edge-engagement tool further comprises rotating the second wheel, in a rotational direction opposite that of the wheel about a second axis parallel with a trailing edge of the second edge portion of the backing layer, and, when rotating the second wheel, translating the wheel, in a second wheel direction that is parallel with the broad surface of the panel and opposite the wheel direction, so that only the second teeth of the second wheel repeatedly engage the second edge portion of the backing layer and just the second edge portion of the backing layer separates from the panel. The preceding subject matter of this paragraph characterizes example 9 of the present disclosure, wherein example 9 also includes the subject matter according to example 8, above.

The method further comprises gripping the second edge portion of the backing layer with a second gripper, when the gripper is gripping the edge portion of the backing layer and after the second edge portion separates from the panel. The method additionally comprises, when gripped by the second gripper and when moving the gripper relative to the panel, moving the second gripper relative to the panel so that the entirety of the backing layer separates rom the panel. The preceding subject matter of this paragraph characterizes example 10 of the present disclosure, wherein example 10 also includes the subject matter according to example 9, above.

The panel comprises a second broad surface that is opposite the broad surface. A second backing layer is secured to, via a second tack force between the second backing layer and the uncured pre-impregnated fiber-reinforced polymer, and flush against the second broad surface of the panel. The method further comprises, after separating the entirety of the backing layer from the panel, a step of at least one of orientating the panel into a second backing-separation orientation relative to a second edge-engagement tool, and positioning the panel into a second backing-separation position relative to the second edge-engagement tool. The method also comprises, after separating the entirety of the backing layer from the panel, a step of at least one of moving the second edge-engagement tool, relative to the panel and when the panel is in at least one of the second backing-separation orientation and the second backing-separation position, so that second-tool-backing-engagement features of the second edge-engagement tool engage only a second-backing-layer edge portion of the second backing layer and just the second-backing-layer edge portion of the second backing layer separates from the panel. The method additionally comprises, after separating the entirety of the backing layer from the panel, a step of at least one of gripping the second-backing-layer edge portion of the second backing layer, after the second-backing-layer edge portion separates from the panel, and, when gripped, moving the second-backing-layer edge portion relative to the panel so that an entirety of the second backing layer separates from the panel. The preceding subject matter of this paragraph characterizes example 11 of the present disclosure, wherein example 11 also includes the subject matter according to any one of examples 1-10, above.

The step of gripping the edge portion of the backing layer comprises gripping the edge portion of the backing layer with a gripper. The step of gripping the second-backing-layer edge portion of the second backing layer comprises gripping the second-backing-layer edge portion with a second gripper. The preceding subject matter of this paragraph characterizes example 12 of the present disclosure, wherein example 12 also includes the subject matter according to example 11, above.

The step of orienting the panel into the second backing-separation orientation relative to the second edge-engagement tool comprises flipping over the panel. The preceding subject matter of this paragraph characterizes example 13 of the present disclosure, wherein example 13 also includes the subject matter according to any one of examples 11-12, above.

The second edge-engagement tool comprises a second-tool plate and the second-tool-backing-engagement features comprise a plurality of second-tool protrusions protruding from the second-tool plate. The step of moving the second edge-engagement tool comprises reciprocating the second-tool plate along a second plane, angled at a second-plate angle relative to the panel and parallel with a second-backing-layer leading edge of the second-backing-layer edge portion, when the panel is oriented in the second backing-separation orientation and positioned in the second backing-separation position, so that only the plurality of second-tool protrusions of the second-tool plate engage only the second-backing-layer edge portion of the second backing layer. The preceding subject matter of this paragraph characterizes example 14 of the present disclosure, wherein example 14 also includes the subject matter according to any one of examples 11-13, above.

The second-tool plate, when reciprocating, is co-planar with or parallel to, the plate, when reciprocating. The preceding subject matter of this paragraph characterizes example 15 of the present disclosure, wherein example 15 also includes the subject matter according to example 14, above.

The second-tool plate, when reciprocating, is angled relative to the plate, when reciprocating. The preceding subject matter of this paragraph characterizes example 16 of the present disclosure, wherein example 16 also includes the subject matter according to example 14, above.

An angle between the second-tool plate, when reciprocating, and the plate, when reciprocating, is no more than 90°. The preceding subject matter of this paragraph characterizes example 17 of the present disclosure, wherein example 17 also includes the subject matter according to example 16, above.

The steps of orienting the panel, positioning the panel, moving the edge-engagement tool, and gripping the edge portion are automated. The preceding subject matter of this paragraph characterizes example 18 of the present disclosure, wherein example 18 also includes the subject matter according to any one of examples 1-17, above.

The method further comprises compressing the backing layer against the broad surface of the panel after orienting the panel into the backing-separation orientation, after positioning the panel into the backing-separation position, and before moving the edge-engagement tool. The preceding subject matter of this paragraph characterizes example 19 of the present disclosure, wherein example 19 also includes the subject matter according to any one of examples 1-18, above.

Compressing the backing layer against the broad surface comprises rolling a roller along the backing layer. The preceding subject matter of this paragraph characterizes example 20 of the present disclosure, wherein example 20 also includes the subject matter according to example 19, above.

The panel comprises a plurality of plies in a stacked arrangement. Each one of the plurality of plies comprises unidirectional fibers. The unidirectional fibers of at least one of the plurality of plies are oriented in a direction that is different than the unidirectional fibers of at least another one of the plurality of plies. The preceding subject matter of this paragraph characterizes example 21 of the present disclosure, wherein example 21 also includes the subject matter according to any one of examples 1-20, above.

The method further comprises step of maintaining a temperature of the panel at or below 720 during the step of moving the edge-engagement tool. The preceding subject matter of this paragraph characterizes example 22 of the present disclosure, wherein example 22 also includes the subject matter according to any one of examples 1-21, above.

The step of maintaining the temperature of the panel at or below 720 comprises blowing air, at a temperature at or below 72°, onto the panel. The preceding subject matter of this paragraph characterizes example 23 of the present disclosure, wherein example 23 also includes the subject matter according to example 22, above.

Further disclosed herein is an automated system for removing a backing layer from a panel, made of an uncured pre-impregnated fiber-reinforced polymer. The backing layer is secured to, via a tack force between the backing layer and the uncured pre-impregnated fiber-reinforced polymer, and flush against a broad surface of the panel. The automated system comprises an edge-engagement tool, comprising backing-engagement features and movable relative to the panel so that backing-engagement features of the edge-engagement tool engage only an edge portion of the backing layer and just the edge portion of the backing layer separates from the panel. The automated system also comprises a gripper, configured to grip the edge portion, when the edge portion is separated from the panel, and movable relative to the panel, when the edge portion is gripped by the gripper, so that an entirety of the backing layer separates from the panel. The preceding subject matter of this paragraph characterizes example 24 of the present disclosure.

The edge-engagement tool comprises a plate. The backing-engagement features comprise a plurality of protrusions protruding from the plate. The plate is fixed at a plate angle relative to the panel. The plate is selectively operable to reciprocate along a plane, angled at the plate angle relative to the panel and parallel with a leading edge of the edge portion. The preceding subject matter of this paragraph characterizes example 25 of the present disclosure, wherein example 25 also includes the subject matter according to example 24, above.

The plate reciprocates along the plane in a forward direction, toward the panel, and a backward direction, away from the panel. Each one of the plurality of protrusions comprises a sharp side facing in the forward direction and a dull side facing in the backward direction. The preceding subject matter of this paragraph characterizes example 26 of the present disclosure, wherein example 26 also includes the subject matter according to example 25, above.

The plate angle is an oblique angle. The preceding subject matter of this paragraph characterizes example 27 of the present disclosure, wherein example 27 also includes the subject matter according to any one of examples 25-26, above.

The plate angle is an acute angle. The preceding subject matter of this paragraph characterizes example 28 of the present disclosure, wherein example 28 also includes the subject matter according to example 27, above.

The automated system further comprises a second edge-engagement tool that comprises second-tool-backing-engagement features. The panel comprises a second broad surface that is opposite the broad surface. A second backing layer is secured to, via a tack force between the second backing layer and the uncured pre-impregnated fiber-reinforced polymer, and flush against the second broad surface of the panel. The preceding subject matter of this paragraph characterizes example 29 of the present disclosure, wherein example 29 also includes the subject matter according to any one of examples 25-28, above.

The second-tool plate, when reciprocating, is co-planar with or parallel to, the plate, when reciprocating. The preceding subject matter of this paragraph characterizes example 30 of the present disclosure, wherein example 30 also includes the subject matter according to example 29, above.

The second-tool plate, when reciprocating, is angled relative to the plate, when reciprocating. The preceding subject matter of this paragraph characterizes example 31 of the present disclosure, wherein example 31 also includes the subject matter according to example 29, above.

The edge-engagement tool comprises a wheel. The backing-engagement features comprise teeth spaced apart circumferentially about the wheel. The wheel is selectively operable to rotate, about an axis parallel with a leading edge of the edge portion of the backing layer, and, while the wheel is rotating, to translate parallel with the broad surface of the panel. The preceding subject matter of this paragraph characterizes example 32 of the present disclosure, wherein example 32 also includes the subject matter according to example 24, above.

The backing layer further comprises a second edge portion at an opposite end of the panel relative to the edge portion. The edge-engagement tool further comprises a second wheel. The backing-engagement features further comprise second teeth spaced apart circumferentially about the second wheel. The second wheel is selectively operable to rotate, in a rotation direction opposite that of the wheel about an axis parallel with a trailing edge of the second edge portion of the backing layer, and, while the second wheel is rotating, to translate parallel with the broad surface of the panel. The preceding subject matter of this paragraph characterizes example 33 of the present disclosure, wherein example 33 also includes the subject matter according to example 32, above.

The automated system further comprises a roller that is selectively operable to roll along the backing layer when the backing layer is adhesively secured to the broad surface of the panel. The preceding subject matter of this paragraph characterizes example 34 of the present disclosure, wherein example 34 also includes the subject matter according to any one of examples 24-33, above.

Additionally disclosed herein is a method of forming a laminated structure. The method comprises a step of orienting a first panel and a backing layer secured to the first panel into a backing-separation orientation relative to an edge-engagement tool. The first panel is made of an uncured pre-impregnated fiber-reinforced polymer and the backing layer is secured to a first-panel broad surface of the first panel via a backing-to-panel tack force between the backing layer and the uncured pre-impregnated fiber-reinforced polymer of the first panel. The method also comprises a step of positioning the first panel into a backing-separation position relative to the edge-engagement tool. The method further comprises a step of moving the edge-engagement tool, relative to the first panel and when the first panel is in the backing-separation orientation and the backing-separation position, so that backing-engagement features of the edge-engagement tool engage the backing layer, at only an edge portion of the backing layer, and just the edge portion of the backing layer separates from the first panel. The method additionally comprises a step of stacking the first panel onto a second panel, made of the uncured pre-impregnated fiber-reinforced polymer, such that the first panel is secured directly to the second panel via panel-to-panel tack force between the pre-impregnated fiber reinforced polymer of the first panel and the uncured pre-impregnated fiber-reinforced polymer of the second panel, and the first panel and the second panel form the laminated structure. The preceding subject matter of this paragraph characterizes example 35 of the present disclosure.

The step of stacking the first panel onto the second panel comprises stacking the first panel onto the second panel such that the first-panel broad surface is secured directly to a second-panel broad surface of the second panel via the panel-to-panel tack force. The preceding subject matter of this paragraph characterizes example 36 of the present disclosure, wherein example 36 also includes the subject matter according to example 35, above.

The first panel comprises a second first-panel broad surface that is opposite the first-panel broad surface. A second backing layer is secured to, via a second tack force between the second backing layer and the uncured pre-impregnated fiber-reinforced polymer, and flush against the second first-panel broad surface of the panel. The step of stacking the first panel onto the second panel comprises positioning the first panel into a second backing-separation position relative to a second edge-engagement tool. The method further comprises moving the second edge-engagement tool, relative to the first panel and when the first panel is in the second backing-separation position, so that second-tool-backing-engagement features of the second edge-engagement tool engage only a second-backing-layer edge portion of the second backing layer and just the second-backing-layer edge portion of the second backing layer separates from the panel. The method also comprises gripping the second-backing-layer edge portion of the second backing layer, after the second-backing-layer edge portion separates from the first panel, and, when gripped, moving the second-backing-layer edge portion relative to the first panel so that an entirety of the second backing layer separates from the first panel. The preceding subject matter of this paragraph characterizes example 37 of the present disclosure, wherein example 37 also includes the subject matter according to example 36, above.

The steps of moving the edge-engagement tool and gripping the edge portion of the backing layer are performed after the step of stacking the first panel onto the second panel. The preceding subject matter of this paragraph characterizes example 38 of the present disclosure, wherein example 38 also includes the subject matter according to any one of examples 35-37, above.

Each one of the first panel and the second panel comprises a plurality of plies in a stacked arrangement. Each one of the plurality of plies of the first panel and the second panel comprises unidirectional fibers. The preceding subject matter of this paragraph characterizes example 39 of the present disclosure, wherein example 39 also includes the subject matter according to any one of examples 35-38, above.

The unidirectional fibers of at least one of the plurality of plies of the first panel are oriented in a direction that is different than the unidirectional fibers of at least another one of the plurality of plies of the first panel. The unidirectional fibers of at least one of the plurality of plies of the second panel are oriented in a direction that is different than the unidirectional fibers of at least another one of the plurality of plies of the second panel. The preceding subject matter of this paragraph characterizes example 40 of the present disclosure, wherein example 40 also includes the subject matter according to example 39, above.

The plurality of plies of at least one of the first panel and the second panel consists of four plies including a first ply, where the unidirectional fibers are oriented at 0°, a second ply, where the unidirectional fibers are oriented at +45, a third ply, where the unidirectional fibers are oriented at 90°, and a fourth ply, where the unidirectional fibers are oriented at −45°. The preceding subject matter of this paragraph characterizes example 41 of the present disclosure, wherein example 41 also includes the subject matter according to example 40, above.

The plurality of plies of both the first panel and the second panel consists of four plies including a first ply, where the unidirectional fibers are oriented at 0°, a second ply, where the unidirectional fibers are oriented at +45, a third ply, where the unidirectional fibers are oriented at 90°, and a fourth ply, where the unidirectional fibers are oriented at −45°. The preceding subject matter of this paragraph characterizes example 42 of the present disclosure, wherein example 42 also includes the subject matter according to example 40, above.

The plurality of plies of at least one of the first panel and the second panel consists of four plies each having unidirectional fibers oriented at 0°. The preceding subject matter of this paragraph characterizes example 43 of the present disclosure, wherein example 43 also includes the subject matter according to example 39, above.

The plurality of plies of the first panel are arranged into a first stack and a second stack. The second stack is stacked onto the first stack. the plies of the first stack are aligned. The plies of the second stack are misaligned. Each one of the plies of the second stack comprises an elongated strip. The elongated strips of the second stack form a cluster. The first-panel broad surface comprises portions of the first stack and the cluster such that the backing layer is secured to portions of both the first stack and the cluster. The preceding subject matter of this paragraph characterizes example 44 of the present disclosure, wherein example 44 also includes the subject matter according to any one of examples 39-43, above.

The method further comprises a step of automatedly separately applying the elongated strips onto the first stack, at different angles relative to each other, to form the cluster of the second stack. The preceding subject matter of this paragraph characterizes example 45 of the present disclosure, wherein example 45 also includes the subject matter according to example 44, above.

The step of automatedly separately applying the elongated strips onto the first stack comprises, while maintaining an orientation of the elongated strips, incrementally rotating the first stack relative to the elongated strips. The preceding subject matter of this paragraph characterizes example 46 of the present disclosure, wherein example 46 also includes the subject matter according to example 45, above.

The method further comprises a step of adjusting a distance, in a stacked direction that is perpendicular to the first-panel broad surface when the first panel is stacked onto the second panel, between the edge-engagement tool and the second panel prior to the step of moving the edge-engagement tool. The preceding subject matter of this paragraph characterizes example 47 of the present disclosure, wherein example 47 also includes the subject matter according to any one of examples 35-46, above.

Each one of the first panel and the second panel comprise a plurality of plies in a stacked arrangement. The method further comprises steps of ultrasonically cutting a sheet, made of the uncured pre-impregnated fiber-reinforced polymer, into the plurality of plies, stacking a first set of the plurality of plies to form the first panel, and stacking a second set of the plurality of plies to form the second panel. The preceding subject matter of this paragraph characterizes example 48 of the present disclosure, wherein example 48 also includes the subject matter according to any one of examples 35-47, above.

The method a further comprises a step of compressing together and heating the first panel and the second panel after the first panel is stacked onto the second panel such that the uncured pre-impregnated fiber-reinforced polymer is cured. The preceding subject matter of this paragraph characterizes example 49 of the present disclosure, wherein example 49 also includes the subject matter according to example 48, above.

The method, further comprises, after the step of compressing and heating the first panel and the second panel, steps of roughening an outer surface of one of the first panel or the second panel to form a roughened outer surface, cleaning the roughened outer surface to form a cleaned-roughened outer surface, applying a primer layer onto the cleaned-roughened outer surface, and applying ink onto the primer layer. The preceding subject matter of this paragraph characterizes example 50 of the present disclosure, wherein example 50 also includes the subject matter according to example 49, above.

The method further comprises a step of compression molding a polymeric layer onto the primer layer and over the ink to form a pre-cut laminated structure. The preceding subject matter of this paragraph characterizes example 51 of the present disclosure, wherein example 51 also includes the subject matter according to example 50, above.

The method further comprises a step of cutting the pre-cut laminated structure to form a cut laminated structure having a predefined shape. The preceding subject matter of this paragraph characterizes example 52 of the present disclosure, wherein example 52 also includes the subject matter according to example 51, above.

The cut laminated structure comprises a strike plate of a golf club head. The preceding subject matter of this paragraph characterizes example 53 of the present disclosure, wherein example 53 also includes the subject matter according to example 52, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Figure 1:
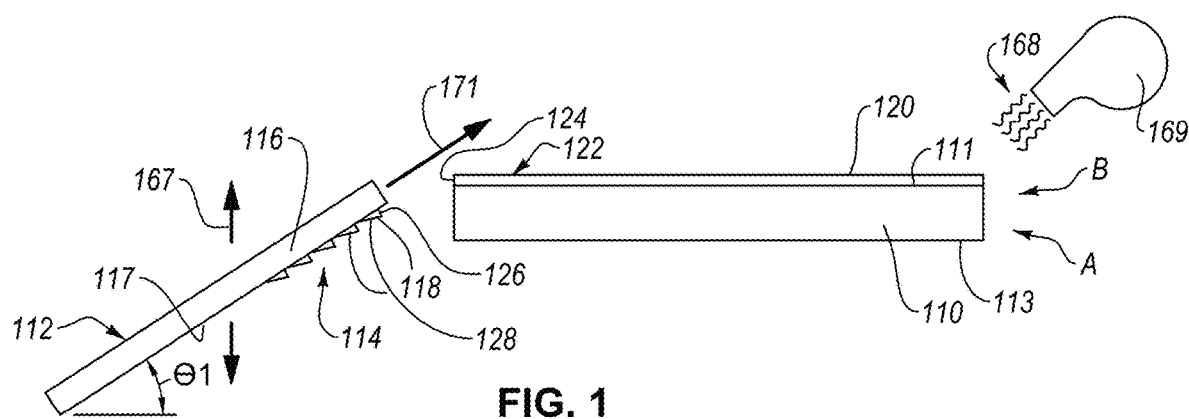
FIG. 1 is a schematic side elevation view of an edge-engagement tool of an automated system for removing a backing layer from a panel, shown with the edge-engagement tool in a first stage of motion, according to one or more examples of the present disclosure.

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Laminated structures, made from layers of uncured pre-impregnated fiber-reinforced polymer, can be difficult to make. Sometimes, the difficulty with making such laminated structures stems from the preparation, handling, and assembly of the layers of uncured pre-impregnated fiber-reinforced polymer. Disclosed herein is a system and method of manufacture that overcomes many of the difficulties associated with the manufacture of laminated structures. For example, the system and method of manufacture disclosed herein can be an automated system and method of manufacture that provides an efficient way to automatedly remove a backing layer from a panel made of uncured pre-impregnated fiber-reinforced polymer. The efficient removal of the back layer enables automated stacking of multiple panels in an efficient and precise manner. As an additional example, the automated system and method of manufacture promotes the efficient and precise automated stacking of multiple strips of uncured pre-impregnated fiber-reinforced polymer at different angles to form a panel. Further, in some examples, the automated system and method of manufacture disclosed herein provides an efficient and precise way to automatedly manufacture a striking plate of a golf club head.

According to some examples, the automated system 100 of the present disclosure includes an edge-engagement tool 112 and a gripper 130. Referring to FIGS. 1-8 and 15-18, in certain examples, the edge-engagement tool 112 is configured to promote partial removal of a backing layer 120 from a panel 110 (e.g., a first panel), such as in an automated manner. As shown in FIGS. 9-12 and 19-21, the gripper 130 is configured to promote full removal of the backing layer 120 from the panel 110.

The panel 110 is made of an uncured pre-impregnated fiber-reinforced polymer. As used herein, an uncured pre-impregnated fiber-reinforced polymer is a material that includes fibers embedded in a polymer matrix, where the polymer matrix is curable, and may be partially cured, but is not fully cured, such as with so-called B-stage pre-preg. In other words, the polymer matrix of the uncured pre-impregnated fiber-reinforced polymer can be partially cured or where some chemical reaction has started, which helps to provide some rigidity compared to a polymer matrix in a liquid or flowable state, but the polymer matrix is not yet fully cured where the chemical reaction has completed. Accordingly, as used herein, when used to describe a cured state of the pre-impregnated fiber-reinforced polymer, uncured means not fully cured or, at most, partially cured. Thus, a partially cured polymer matrix is in a cured state between a state without any curing (e.g., A stage), where the polymer matrix is in a liquid or flowable form and has not undergone any chemical reaction, and fully cured, where the polymer matrix is in a rigid form and has undergone a complete chemical reaction. The polymer matrix, being partially cured, is pliable, easily deformable, tacky, and handleable such that the fibers can be held in place by the polymer matrix and the pre-impregnated fiber-reinforced polymer can be shaped into a desired shape prior to a final cure of the polymer matrix. In certain examples, after the polymer matrix, which can be a thermoset epoxy or resin, is cured or hardened, the fiber-reinforced polymer becomes stiff, unpliable, and non-tacky. In some examples, the epoxy can be any of various type of epoxy and the fibers can be any of various fibers, such as carbon fibers, glass fibers, and the like. In certain examples, the volume fraction of fibers, of the uncured pre-impregnated fiber-reinforced polymer, is 50%, and the weight fraction of the epoxy, of the uncured pre-impregnated fiber-reinforced polymer, is 45%.

Figure 23:
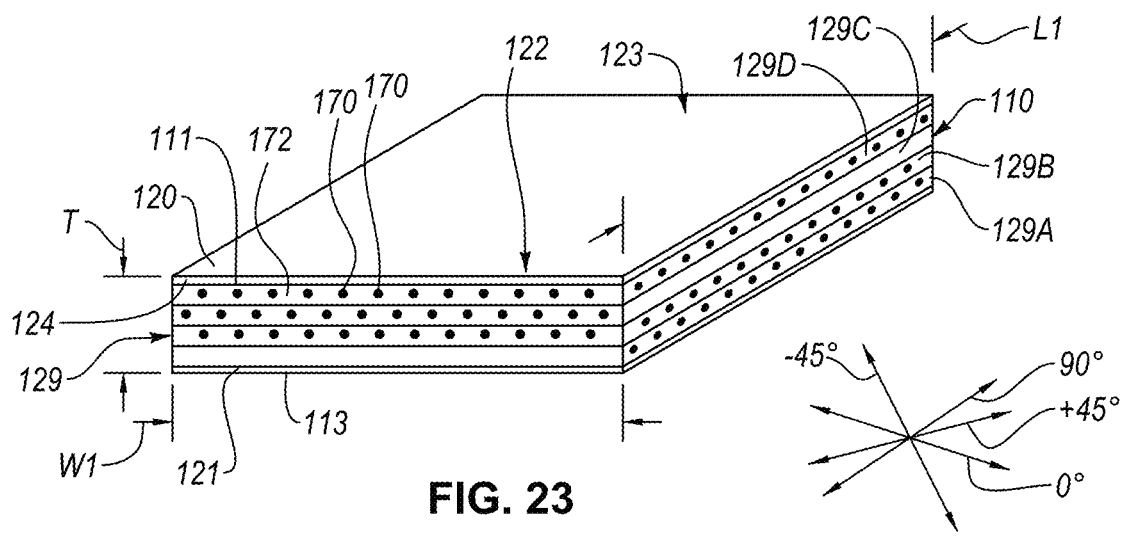
FIG. 23 is a schematic isotropic view of a panel, according to one or more examples of the present disclosure.

Referring to FIG. 23, one example of a panel 110 is shown. The panel 110 is made of a pre-impregnated fiber-reinforced polymer. More specifically, the panel 110 includes unidirectional fibers 170 embedded in a polymer matrix 172.

Although, in certain examples, the panel 110 includes no more than one ply, in other examples, the panel 110 includes a plurality of plies 129. Each one of the plies 129 is made of the pre-impregnated fiber-reinforced polymer. Accordingly, the unidirectional fibers 170 of each one of the plies 129 are continuous and parallel to each other. The plies 129 of the panel 110 are stacked together in a stacked arrangement (e.g., form a stack of plies). Because the polymer matrix of the plies 129 is only partially cured, the plies 129 of the panel 110 are coupled together or maintained in the stacked arrangement via the tackiness of the polymer matrix. As used herein, the adhesive force, generated by the tackiness of the polymer matrix, that couples the plies 129 of the panel 110 together, that couples multiple panels together, and that couples the backing layer 120 to a ply 129 is known as a tack force. More specifically, the tack force that adhesively bonds together plies or panels is considered a panel-to-panel tack force, and the tack force that adhesively bonds a backing layer to a ply or a panel is considered a backing-to-panel tack force.

The plies 129 of a given panel 110 can be arranged relative to each other such that the unidirectional fibers 170 of a given ply 129 are parallel to or angled relative to the unidirectional fibers 170 of an adjacent one of the plies 129. In one example, the plies 129 of the panel 110 are arranged relative to each other such that the unidirectional fibers 170 of all the plies 129 of the panel 110 are unidirectional, parallel to each other, or extend in the same direction. However, in other examples, the plies 129 of the panel 110 are arranged relative to each other such that the unidirectional fibers 170 of any one of the plies 129 are angled relative to any other one of the plies 129.

Figure 32:
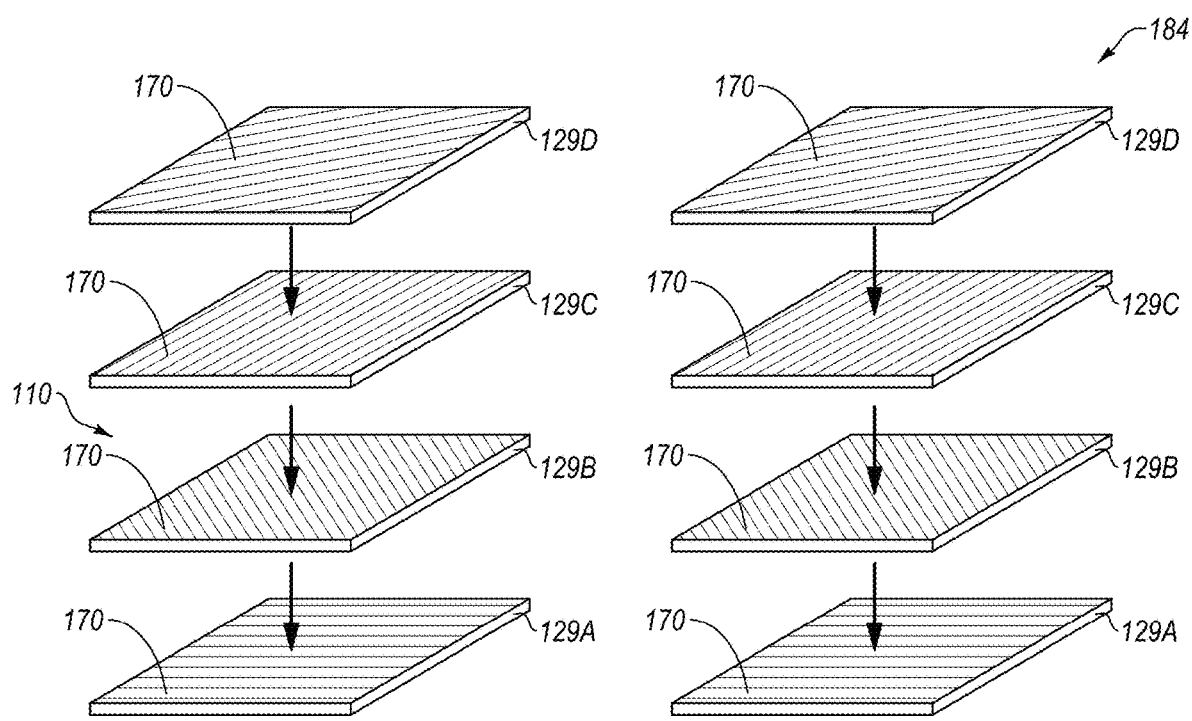
FIG. 32 is a schematic, isotropic view of multiple plies being stacked to form a first panel and multiple plies being stacked to form a second panel, according to one or more examples of the present disclosure.

In the illustrated example of FIGS. 23 and 32, the panel 110 includes four plies 129. The four plies 129 of the panel 110 of FIGS. 23 and 32 include a first ply 129A, a second ply 129B, a third ply 129C, and a fourth ply 129D. The unidirectional fibers 170 of the first ply 129A are orientated at 0°, the unidirectional fibers 170 of the second ply 129B are orientated at +45°, relative to the unidirectional fibers 170 of the first ply 129A, the unidirectional fibers 170 of the third ply 129C are orientated at 90°, relative to the unidirectional fibers 170 of the first ply 129A, and the unidirectional fibers 170 of the fourth ply 129D are orientated at −45°, relative to the unidirectional fibers 170 of the first ply 129A.

As used herein, a panel 110 having the ply arrangement shown in FIG. 23 is one example of a quasi-isotropic panel. Moreover, the panel 110 of FIG. 23 is non-symmetric relative to a midplane that is parallel with the broad surfaces of the plies and separates the panel 110 into two halves. Although the plies 129 of the panel 110 shown in FIGS. 23 and 32 have a [0°, +45°, 90°, −45°] layup configuration, in other examples, the layup configuration can be different, such as [0°, 90°, +45°, −45°]. It is recognized that the particular layup of the panel 110 in FIGS. 23 and 32 ensures the fibers of adjacent plies are not angled more than 45° relative to each other, which helps to improve strength and performance of the panel. According to some examples, the plies 129 of the panel 110 can have yet a different layup configuration, such as including a ply with unidirectional fibers 170 oriented at +60° and a ply with unidirectional fibers 170 orientated at −60°, relative to a ply with unidirectional fibers 170 oriented at 0°. In other words, in view of the foregoing, the panel 110 of the present disclosure can have one ply or any number of stacked plies with fibers at any of various orientations relative to each other. The relative orientation of the fibers of the plies corresponds with a desired directional stiffness (e.g., x-axis stiffness or y-axis stiffness) and desired level of stiffness in such directions of the panel 110.

Although the unidirectional fibers 170 from ply to ply may not be parallel, the plies 129 of the panel 110 of the example shown in FIG. 23 are aligned. The plies 129 are aligned because the outer peripheral edges of the plies 129 are aligned or flush. As used herein, with regard to the alignment of plies 129, the peripheral edges of the plies 129 are flush when corresponding edges of the plies are substantially co-planar. Because the plies 129 are aligned, a thickness T of the panel 110 is constant or the same at any location on the panel 110.

Figure 24:
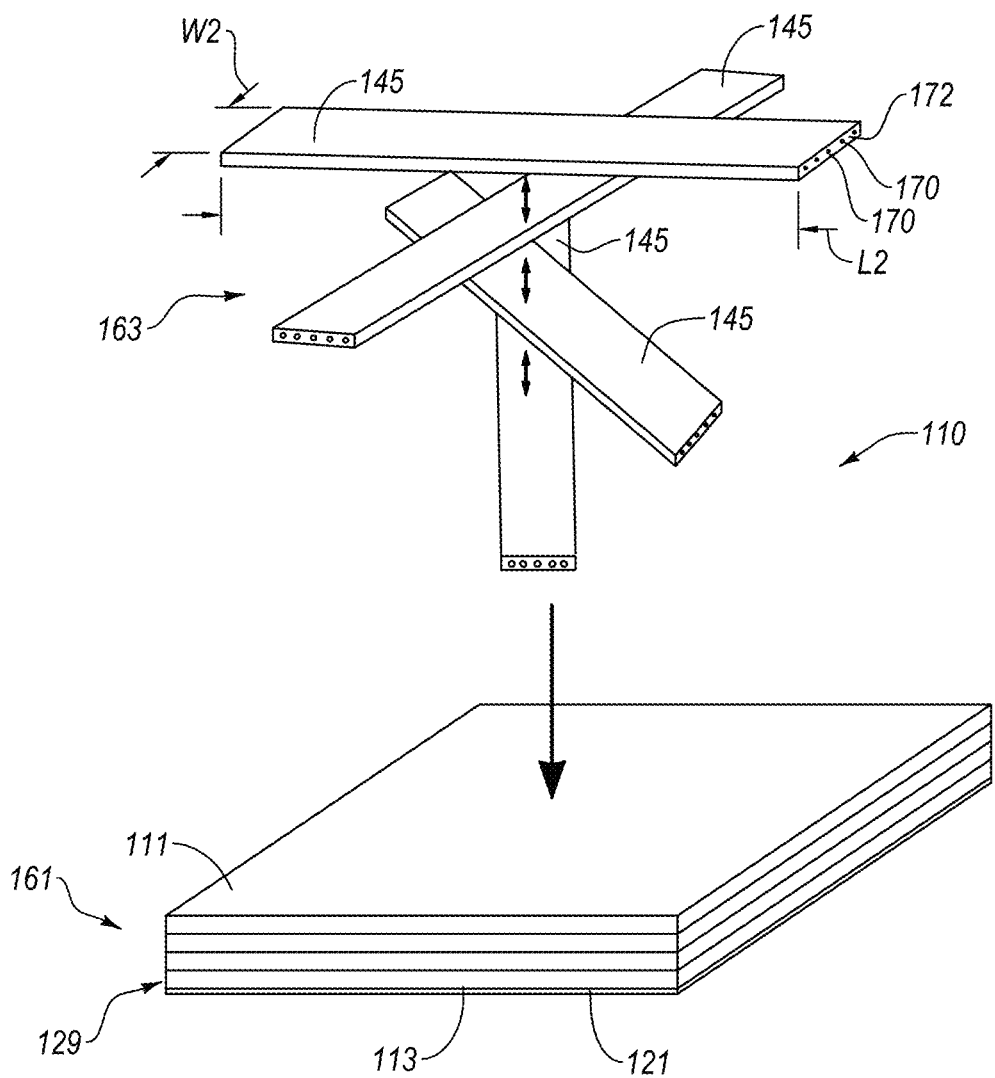
FIG. 24 is a schematic, isotropic, exploded view of a panel, according to one or more examples of the present disclosure.
Figure 26:
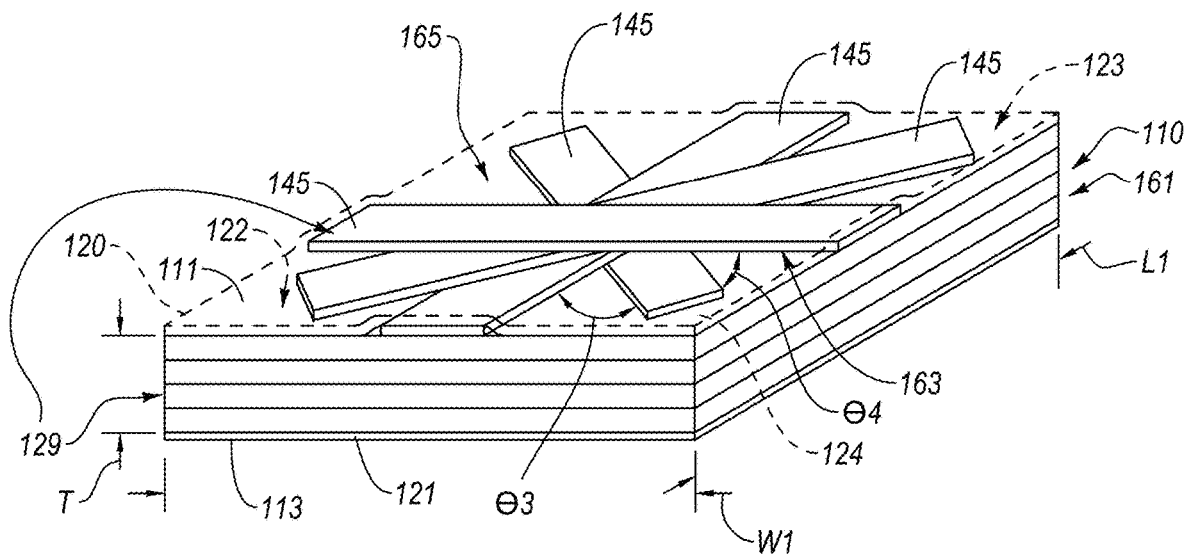
FIG. 26 is a schematic, isotropic view of a panel, according to one or more examples of the present disclosure.
Figure 27:
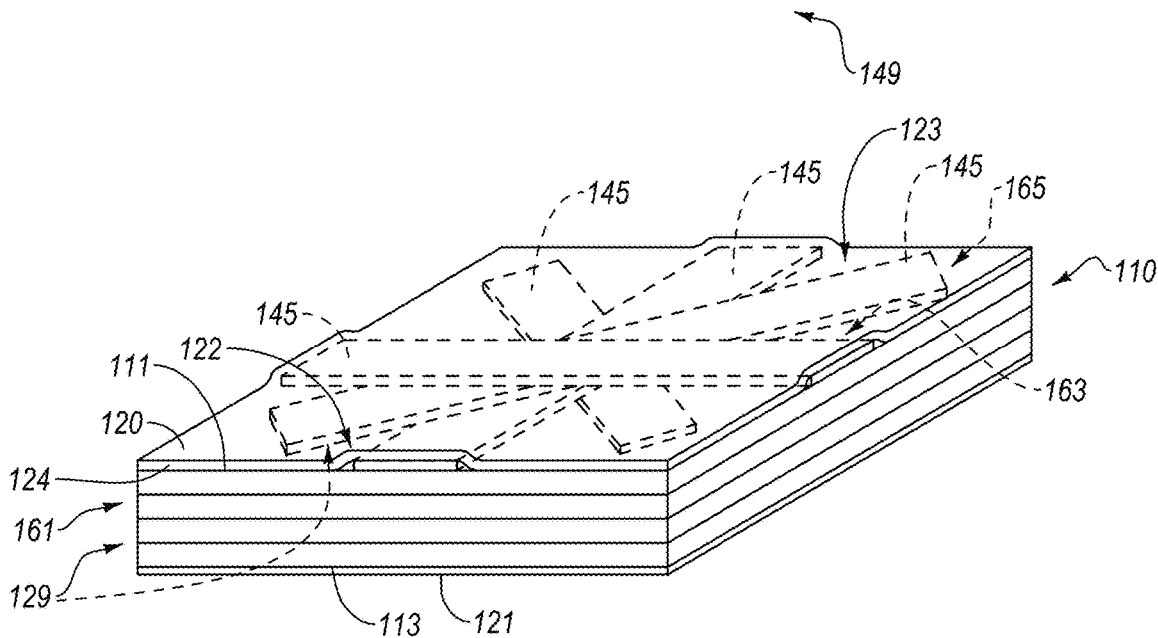
FIG. 27 is a schematic, isotropic view of the panel of FIG. 26, according to one or more examples of the present disclosure.

Referring to FIGS. 24, 26, and 27, in some examples, the panel 110 is considered a cluster panel because the panel 110 includes a cluster 165 of elongated strips 145. The cluster 165 is stacked onto aligned plies, like that shown in FIG. 23, to form the panel 110. The cluster 165 defines a second stack 163 of the panel 110 and the aligned plies define a first stack 161 of the panel 110. Therefore, the plies 129 of the second stack 163 are the elongated strips 145. The elongated strips 145 are made of an uncured pre-impregnated fiber-reinforced polymer. Moreover, as shown in FIG. 24, each one of the elongated strips 145 is elongated along a length L2 of the elongated strip 145, which can be the same as or less than a length L1 of the first stack 161 (i.e., a length L1 of the panel 110). Accordingly, each one of the elongated strips 145 has a length L2 that is greater than a width W2 of the elongated strip 145. The unidirectional fibers 170 of each one of the elongated strips 145 extend parallel to the length L2 of the elongated strip 145. The elongated strips 145 are considered strips because the width W2 of each one of the strips 145 is smaller than a width W1 of the first stack 161 of the panel 110 (i.e., a width W1 of the panel 110) onto which the elongated strips 145 are stacked to form the panel 110. According to some examples, the width W2 of each one of the elongated strips 145 is the same. However, in other examples, the width W2 of at least one of the elongated strips 145 can be different than the width W2 of at least another one of the elongated strips 145.

In certain examples, the elongated strips 145 are stacked onto the first stack 161 such that a center (or midpoint) of each one of the elongated strips 145 is centered on the first stack 161. Accordingly, the cluster 165 or second stack 163 is centered on the first stack 161 in some examples. However, although the elongated strips 145 of the cluster 165 are centered on the first stack 161, the elongated strips 145 are angled relative to each other such that the elongated strips 145 are considered misaligned. More specifically, the elongated strips 145 are misaligned because the outer peripheral edges of the plies 129 are not aligned or not flush. Each one of the elongated strips 145 is angled at a cluster angle θ3, relative to a first adjacent one of the elongated strips 145, and at a cluster angle θ4, relative to a second adjacent one of the elongated strips 145. In some examples, the cluster angle θ3 is different than the cluster angle θ4. According to one example, the cluster angle θ3 is 35° and the cluster angle θ4 is 55°. However, in other examples, the cluster angle θ3 is the same as the cluster angle θ4. According to one example, in which the cluster 165 has four elongated strips 145, both the cluster angle θ3 and the cluster angle θ4 are 45°. In an alternative example, such as when the cluster 165 has eight elongated strips 145, both the cluster angle θ3 and the cluster angle θ4 are 22.5°. Accordingly, in some examples, the cluster 165 forms a symmetrical star shape centered on the first stack 161.

Figure 30A:
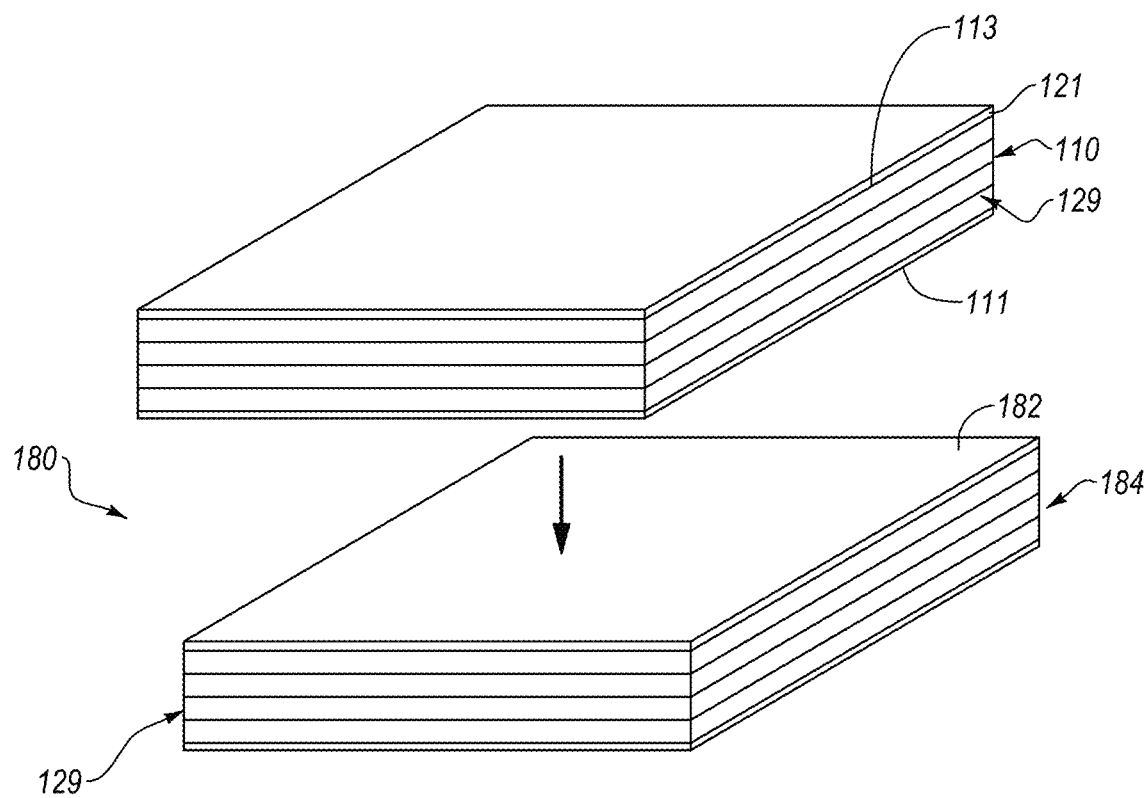
FIG. 30A is a schematic, isotropic view of a first panel being stacked onto a second panel, according to one or more examples of the present disclosure.
Figure 30B:
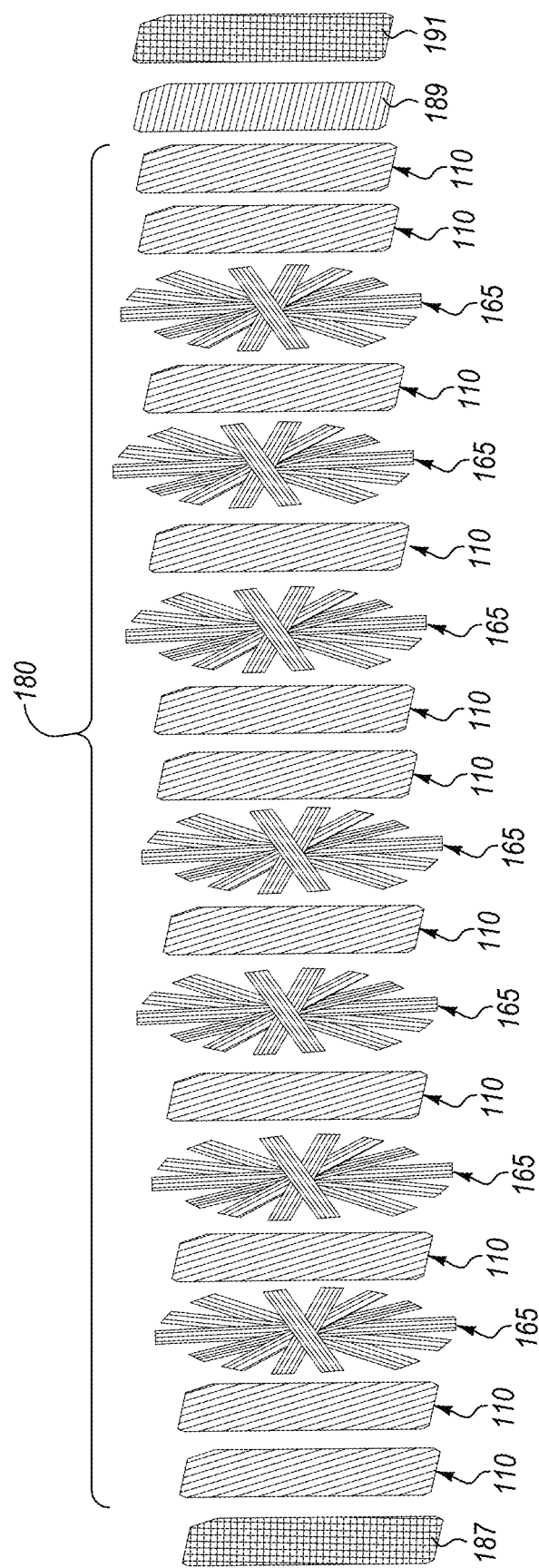
FIG. 30B is a schematic, isotropic, exploded view of a laminated structure, according to one or more examples of the present disclosure.

Although the cluster 165 of FIGS. 26 and 27 includes four elongated strips 145, in other examples, such as shown in FIG. 30B, the cluster 165 includes more than four elongated strips 145. In one particular example, the cluster 165 includes seven elongated strips 145.

Figure 30C:
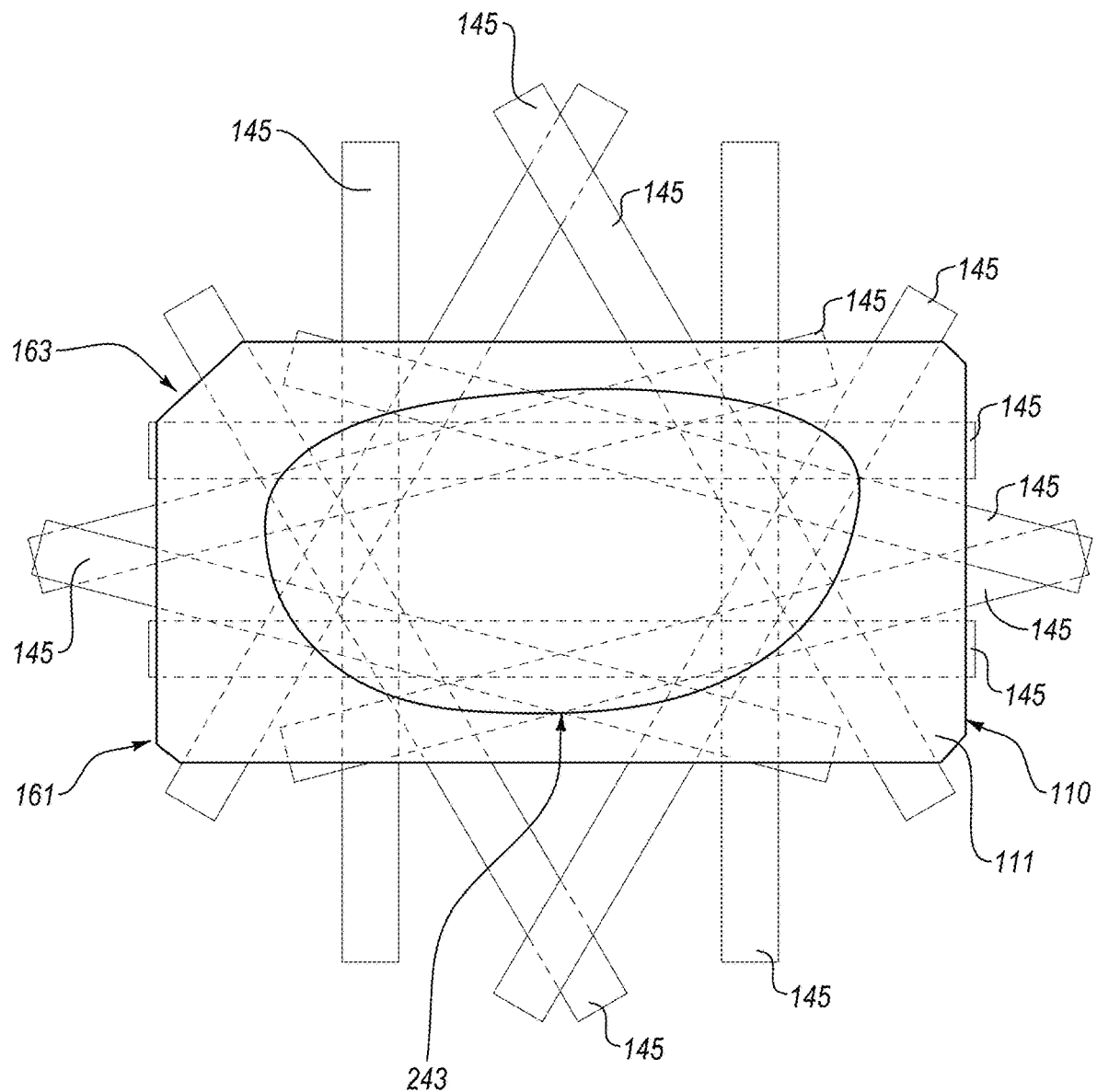
FIG. 30C is a schematic, top plan view of a panel, according to one or more examples of the present disclosure.

Alternatively, in some examples, the elongated strips 145, while partially overlapping each other, are not all centered on the first stack 161. In such examples, the cluster 165 may not be symmetrical, but may have any of various non-symmetrical shapes dictated by the angles and positioning of the elongated strips 145 relative to each other. Alternatively, although the elongated strips 145 are not centered on the first stack 162, the cluster 165 may nevertheless be symmetrical about the center of the first stack. For example, referring to FIG. 30C, the elongated strips 145 are applied onto the broad surface 111 of a first stack 161 of a panel 110 at locations that are offset from a center of the first stack 161. In this manner, the cluster 165, which forms a second stack 163, can help to increase a thickness of a strike plate along a perimeter of a strike plate 243 (indicated virtually by an outline on the panel 110).

For each cluster 165, only portions of the elongated strips 145 overlap each other. Because the elongated strips 145 are misaligned on the first stack 161, a thickness T of a cluster panel is different at different locations across the cluster panel. In other words, a cluster panel, such as shown in FIGS. 26 and 27, has a variable thickness. For some clusters 165, such as symmetrical clusters, the thickness of the cluster 165 varies away from an axis-of-symmetry or center of the cluster 165, but is the same at multiple locations that are the same distance away from the center of the cluster 165, such as with a cone or conical frustum. However, for other clusters 165, such as non-symmetrical clusters, the thickness of the cluster 165 can vary such that different locations that are the same distance away from a center of the cluster 165 having different thicknesses.

Figure 25:
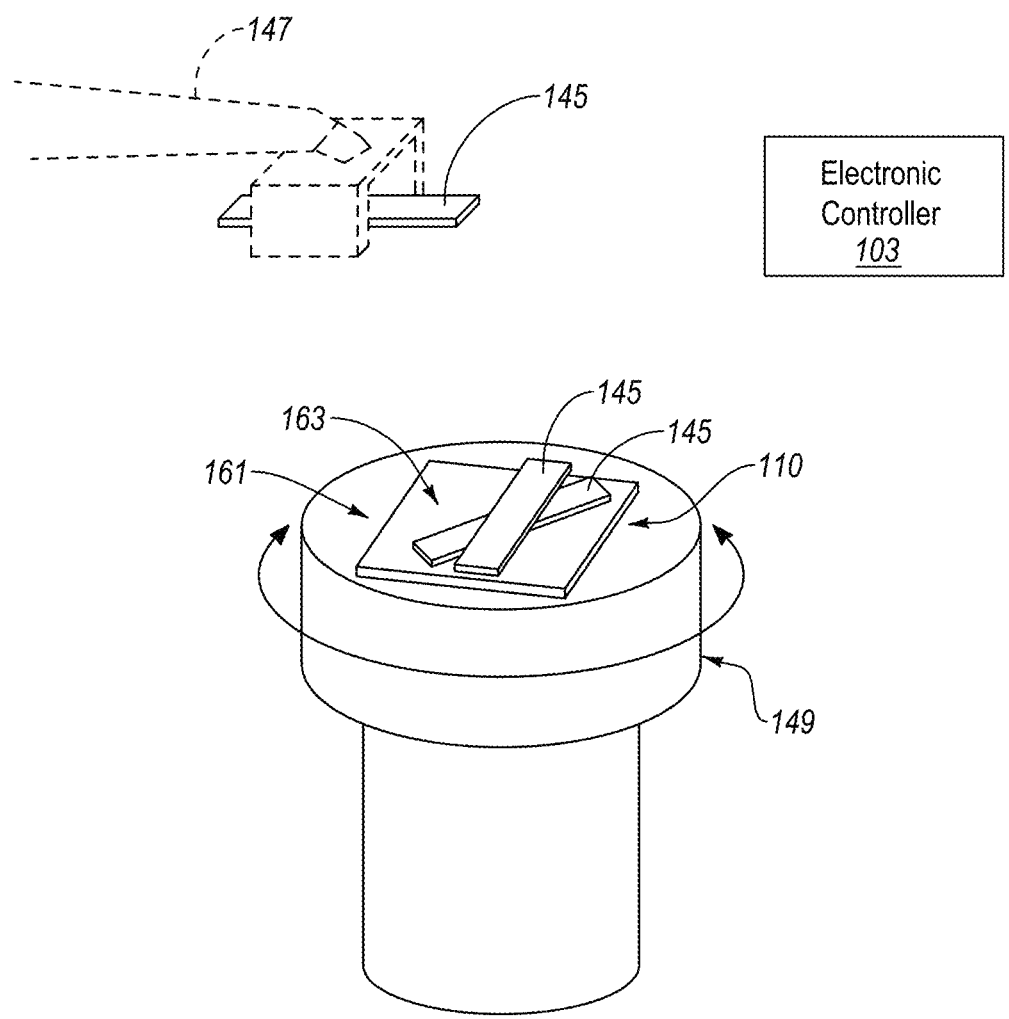
FIG. 25 is a schematic, isotropic view of a robotic arm and rotatable platform of an automated system for forming a panel, according to one or more examples of the present disclosure.

In some examples, the elongated strips 145 are laid up on the first stack 161 via an automated process. For example, as shown in FIG. 25, the automated system 100 can further include a robotic arm 147 and a rotatable platform 149. The robotic arm 147 is configured to grasp and maintain an orientation of an elongated strip 145. With the elongated strip 145 maintained in a given orientation, the robotic arm 147 is translationally movable relative to the rotatable platform 149 to apply the elongated strip 145 onto the first stack 161, when the first stack 161 is supported on the rotatable platform 149. After one of the elongated strips 145 is applied onto the first stack 161, the rotatable platform 149 rotates a predetermined amount (corresponding to a desired angular difference between the elongated strips 145) and the robotic arm 147 applies another elongated strip 145 onto the previously applied elongated strip 145 and the first stack 161. Rotation of the rotatable platform 149 is computer controlled, which helps to ensure the relative orientations of, or angular differences between, the elongated strips 145, applied onto each other and the first stack 161, are within a predetermined minimal tolerance of the desired angular differences between the elongated strips 145.

According to certain examples, the automated system 100 supplies a continuous length of uncured pre-impregnated fiber-reinforced material, such as from a roll, to the robotic arm 147. In one example, the robotic arm 147 grasps an end portion of the continuous length of material and, while grasped, a cutter of the automated system 100 cuts the material to a length corresponding with the elongated strip 145, thus forming the elongated strip 145. Alternatively, in another example, the continuous length of material is cut, by a cutter of the automated system 100, to the length corresponding with the elongated strip 145, before the robotic arm 147 grasps the elongated strip 145. In either example, the automated system 100 enables cutting of a continuous length of uncured pre-impregnated fiber-reinforced material into elongated strips 145 concurrently or near concurrently with grasping the material by the robotic arm 147. In this manner, the elongated strips 145 can be cut from a continuous length of material and applied onto the panel 110 in a continuous automated process.

In view of the foregoing, the panels 110 of the present disclosure, in some examples, can be the same as or similar to the panels disclosed in U.S. Patent Application Publication No. 2012/0199282, published Aug. 9, 2012, which is incorporated herein by reference. The panel 110 of the present disclosure, in some examples, is flat and has a generally rectangular outer peripheral shape. However, in other examples, the panel 110 can be contoured and/or have an outer peripheral shape other than rectangular, such as square, triangular, polygonal, and the like.

Whether a quasi-isotropic panel or a cluster panel, the panel 110 of the present disclosure includes a first broad surface 111 (e.g., a first-panel broad surface) and a second broad surface 113 (e.g., a second first-panel broad surface), opposite the first broad surface 111. The first broad surface 111 is a first outward-facing surface or surfaces of the ply or plies 129 of the panel 110 not tack bonded to another ply 129 of the panel 110. The second broad surface 113 is a second outward-facing surface or surfaces of the ply or plies 129 of the panel not tack bonded to another ply 129 of the panel 110 and facing a direction opposite that of the first outward-facing surface or surfaces. The first broad surface 111 and the second broad surface 113 are considered broad surfaces because they are parallel to a width and length of the panel and perpendicular to a thickness of the panel, where the thickness of the panel is smaller than the width or the length of the panel. The first broad surface 111 or the second broad surface 113 can include the outwardly-facing surface of a single ply 129, such as with the quasi-isotropic panel of FIG. 23. Alternatively, the first broad surface 111 or the second broad surface 113 can include the outwardly-facing surfaces of multiple plies 129, such as the outwardly-facing surface of an outer ply 129 of the first stack 161 and the multiple outwardly-facing surfaces of the elongated strips 145 of the second stack 163 of the cluster panel of FIGS. 26 and 27. Accordingly, a broad surface of the panel 110 need not be a single surface.

Referring to FIGS. 23, 26, and 27, a backing layer 120 is secured to and substantially flush against one or both of the first broad surface 111 and the second broad surface 113 of the panel 110. As used herein, with regard to the coupling between the backing layer 120 and a broad surface of the panel 110, flush means directly abutting or immediately adjacent. Moreover, the backing layer 120 is flush against a broad surface when the backing layer 120 is substantially flush or substantially flat against the broad surface. Accordingly, even if some small portions of the backing layer 120 are not directly coupled to a broad surface, such as via small air pockets, the backing layer 120 can still be considered to be flush against a broad surface. In the examples shown in FIGS. 23, 26, and 27, one backing layer 120 (i.e., a first backing layer) is secured to the first broad surface 111 of the panel 110 and another backing layer 121 (i.e., a second backing layer) is secured to the second broad surface 113 of the panel 110. The backing layer 120 is secured to the first broad surface 111 via the tack force that is generated by the tackiness of the uncured pre-impregnated fiber-reinforced polymer of the panel 110 and acts to adhesively bond the backing layer 120 to the first broad surface 111. Similarly, the backing layer 121 is secured to the second broad surface 113 via the tack force generated by the tackiness of the panel 110, which adhesively bonds the backing layer 121 to the second broad surface 113. The tack force, provided by the tackiness of the pre-impregnated fiber-reinforced polymer, is sufficient to retain the backing layers against the broad surfaces, but is overcome by a pull-off force greater than the tack force. Although the pull-off force is relatively small, such that manual removal of the backing layer is possible, manually applying such a pull-off force to the backing layers can be difficult because gripping enough of the backing layers to pull them off of the panel 110 is cumbersome due to the thinness or low profile of the backing layers.

Additionally, the tack force is proportional to the temperature of the pre-impregnated fiber-reinforced polymer. In other words, the higher the temperature the higher the tack force. If the tack force is too high, the structural integrity of the pre-impregnated fiber-reinforced polymer can be negatively affected as the pull-off force necessary to remove the backing layers could be enough to pull away some of the impregnated fiber-reinforced polymer along with the backing layer. Accordingly, the temperature of the pre-impregnated fiber-reinforced polymer can be maintained within a predetermined range to promote a secure retention of the backing layer to the panel, as well as to promote removal of the backing layer from the panel 110 without damaging the panel.

According to some examples, the backing layer 120 and the backing layer 121 (e.g., second backing layer) are made of a fibrous material, such as paper, a polymeric material, such as plastic, or any of various other release or protective films. Accordingly, a backing layer, as used herein, can be any of various release films. The backing layers are secured to the panel 110 to protect the panel 110 from impact damage and contaminants (such as dust and debris) during transportation, storage, and handling of the panel 110. In some examples, each one of the plies 129 of the panel 110 is cut from a sheet of the pre-impregnated fiber-reinforced polymer. The sheet of the pre-impregnated fiber-reinforced polymer, which can come in the form of a continuous roll of the pre-impregnated fiber-reinforced polymer, includes a protective film on both sides of the sheet. After, or before, the plies 129 are cut from the sheet, the protective film is removed from the sheet. The plies 129, including the elongated strips 145 if applicable and with the protective film removed, are then stacked together, as disclosed above, to form the panel 110. After the plies 129 are stacked together, the backing layer 120 and the backing layer 121 are secured to the first broad surface 111 and the second broad surface 113, respectively, such that the backing layers are substantially flush against the broad surfaces. With the backing layers secured to the panel 110, the panel 110 is then ready to be assembled into a laminated structure 180 using the automated system 100.

Referring to FIGS. 1-8 and 15-18, various stages of motion of the edge-engagement tool 112, relative to the panel 110, is shown. The motion of the edge-engagement tool 112 relative to the panel 110 helps to separate only an edge portion 122 of the backing layer 120 from the panel 110. In some examples, the position and orientation of the edge-engagement tool 112, while the edge-engagement tool 112 is moved, relative to the panel 110, is fixed. Accordingly, the panel 110 is oriented into a backing-separation orientation A and positioned in a backing-separation position B, relative to the edge-engagement tool 112, that enables the edge-engagement tool 112 to engage only the edge portion 122 of the backing layer 120. Although not shown, the automated system 100 includes one or more automated tools (e.g., robotic arms or robotic actuators) that secure the panel 110 and move it into and maintain it in the backing-separation orientation A and the backing-separation position B.

With the panel 110 in the backing-separation orientation A and the backing-separation position B, the automated system 100 moves the edge-engagement tool 112, relative to the panel 110, so that backing-engagement features 114 of the edge-engagement tool 112 engage the backing layer 120, at only the edge portion 122 of the backing layer 120, and so that just the edge portion 122 of the backing layer 120 separates from the panel 110. The edge portion 122 of the backing layer 120 is a portion of the backing layer 120 that includes a leading edge 124 of the backing layer 120. The leading edge 124 extends along and is parallel with an entire width W1 of the panel. Additionally, the edge portion 122 includes the portion of the backing layer 120 that extends away from the leading edge 124, in a direction parallel with the length L1 of the panel, a distance D less than an entire length L1 of the panel 110 (see, e.g., FIG. 8). In some examples, the distance D is no more than half an entire length L1 of the panel 110. According to other examples, the distance D is no more than a quarter of an entire length L1 of the panel 110.

As shown in FIGS. 1-8, in some examples, the edge-engagement tool 112 includes a plate 116 and the backing-engagement features 114 include a plurality of protrusions 118. The plate 116 is flat and thin in some examples. Moreover, the plate 116 defines an engagement surface 117. The protrusions 118 protrude or extend from the engagement surface 117 of the plate 116. In some examples, the protrusions 118 have a sharp side 126, which includes at least one sharp edge, and a dull side 128 (see, e.g., FIGS. 2B, 3B, and 4B). The sharp side 126 is considered a sharp side because it is sharper than the dull side 128, which is considered a dull side because it is duller or less sharp than the sharp side 126. The protrusions 118 are arranged on the plate 116 such that the sharp sides 126 of all the protrusions 118 face a first direction and such that the dull sides 128 of all the protrusions 118 face a second direction, opposite the first direction. The sharp sides 126 are configured to grab, pierce, or penetrate the backing layer 120 and the dull sides 128 are configured to avoid piercing or penetrating the backing layer 120.

The plate 116 is fixed at a plate angle θ1 relative to the panel 110, when the panel 110 is in the backing-separation orientation A and positioned in the backing-separation position B. The plate angle θ1 is the angle defined between the engagement surface 117 and the first broad surface 111 of the panel 110. Moreover, because the backing layer 120 is flush against the first broad surface 111, the plate angle θ1 is also defined as the angle between the engagement surface 117 and the backing layer 120. The plate angle θ1 is selected to enable the backing-engagement features 114 to engage the backing layer 120 and lift at least a portion of the edge portion 122 of the backing layer 120 away from the panel 110 without engaging the panel 110. The plate angle θ1 is an oblique angle, and more particularly, as shown in FIG. 1, the plate angle θ1 is an acute angle.

The plate 116 of the edge-engagement tool 112 is operationally coupled with an actuator (not shown) that, when actuated, moves (e.g., reciprocates) the plate 116 along a plane. The plane is angled at the plate angle θ1 and is parallel with the leading edge 124 of the edge portion 122.

The plate 116 moves along the plane toward the panel 110, in a forward direction 171, and away from the panel 110, in a backward direction 173, which is opposite the forward direction 171. The protrusions 118 are arranged on the plate 116 such that the sharp sides 126 of all the protrusions 118 face the forward direction 171 and the dull sides 128 of all the protrusions 118 face the backward direction 173.

Figure 2A:
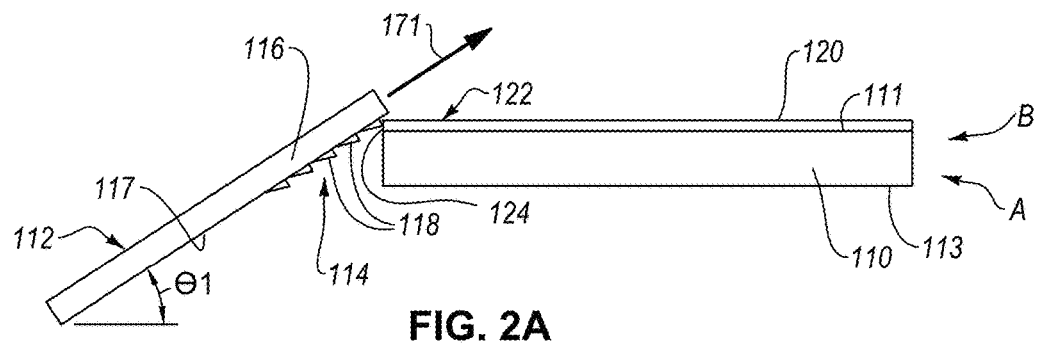
FIG. 2A is a schematic side elevation view of the edge-engagement tool of FIG. 1, shown with the edge-engagement tool in a second stage of motion, according to one or more examples of the present disclosure.
Figure 2B:
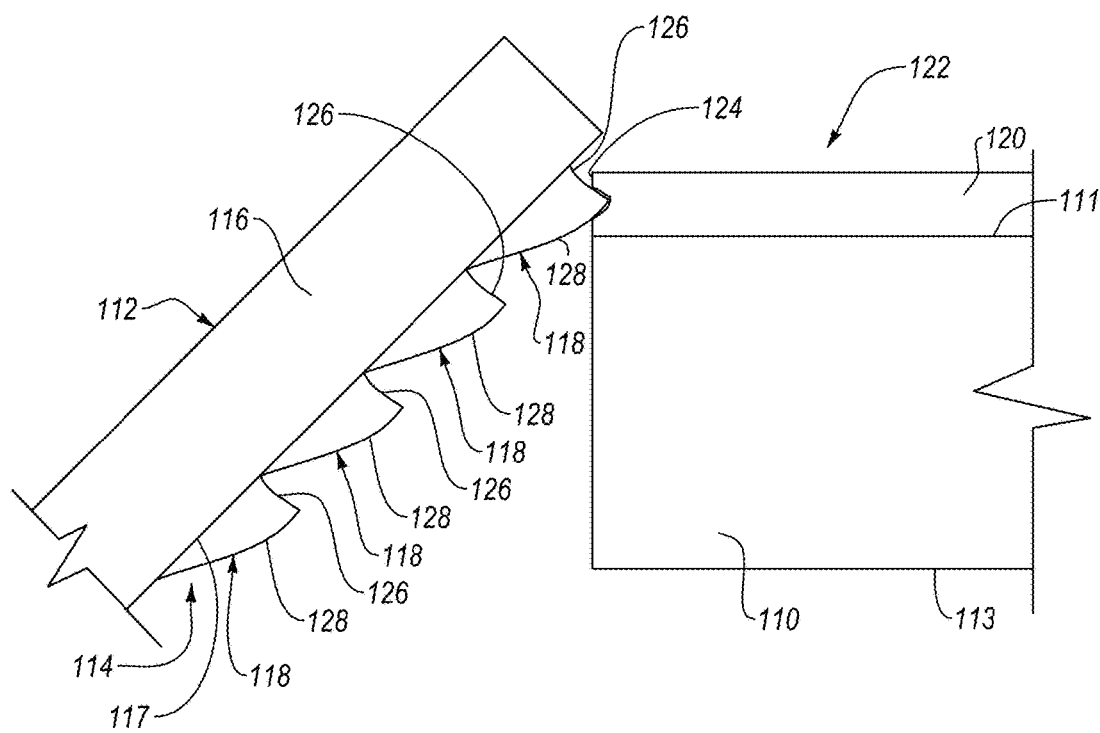
FIG. 2B is a schematic, side elevation, enlarged view of a portion of the edge-engagement tool of FIG. 2A, according to one or more examples of the present disclosure.
Figure 3A:
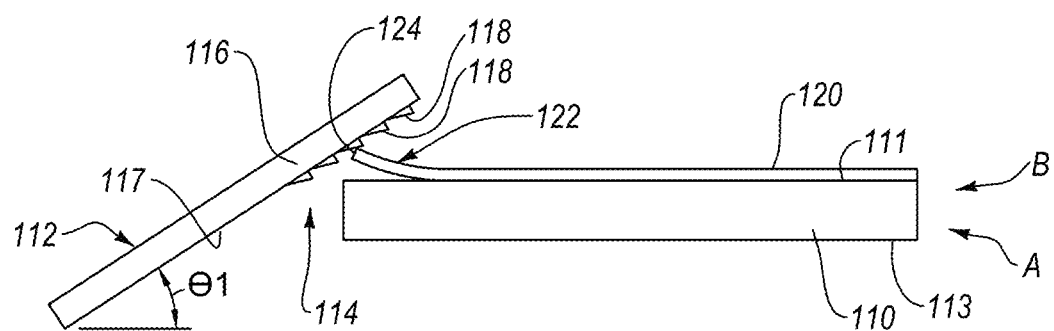
FIG. 3A is a schematic side elevation view of the edge-engagement tool of FIG. 1, shown with the edge-engagement tool in a third stage of motion, according to one or more examples of the present disclosure.
Figure 3B:
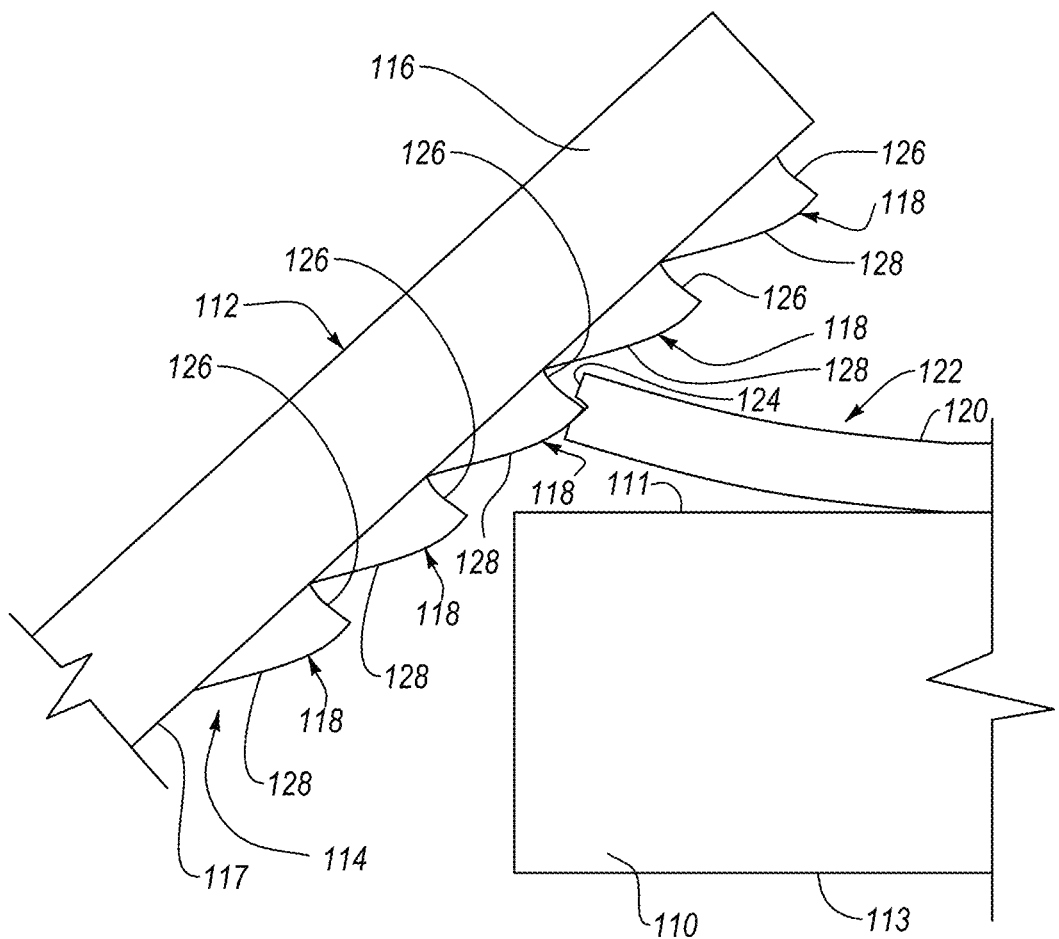
FIG. 3B is a schematic, side elevation, enlarged view of a portion of the edge-engagement tool of FIG. 3A, according to one or more examples of the present disclosure.

Referring to FIG. 1, the plate 116 is shown moving in the forward direction 171, at the plate angle θ1, toward the panel 110. As the plate 116 moves in the forward direction 171, the backing-engagement features 114 eventually engage the leading edge 124 of the backing layer 120, as shown in FIGS. 2A and 3A. Initially, a first one or ones of the backing-engagement features 114 engage the leading edge 124 of the backing layer 120, as shown in FIG. 2A, and, upon further movement of the plate 116 in the forward direction 171, an additional one or ones of the backing-engagement features 114 engage the leading edge 124 and potentially an underside of the edge portion 122. In the illustrated example of FIG. 2B, as the plate 116 moves in the forward direction 171, the sharp side 126 of at least a first one of the protrusions 118 at least partially penetrates (e.g., deforms) the leading edge 124 of the backing layer 120. The penetration or deformation of the leading edge 124 by the sharp side 126 imparts an upwardly directed force to the leading edge 124, which results in the leading edge 124 partially separating from the panel 110. Further movement of the plate 116 in the forward direction 171 results in the first one or ones of the protrusions 118 disengaging from the backing layer 120, and the sharp side 126 of second one or ones of the protrusions 118 penetrating or deforming the leading edge 124 (see, e.g., FIG. 3B). The penetration or deformation of the leading edge 124 by the sharp side 126 of the second one or ones of the protrusions 118 imparts an upwardly directed force to the leading edge 124, which results in the leading edge 124 further separating from the panel 110. Further movement of the plate 116 in the forward direction 171 results in the second one or ones of the protrusions 118 disengaging from the backing layer 120, and the sharp side 126 of another one or other ones of the protrusions 118 penetrating or deforming the leading edge 124, lifting, and disengaging in a similar manner.

Figure 4A:
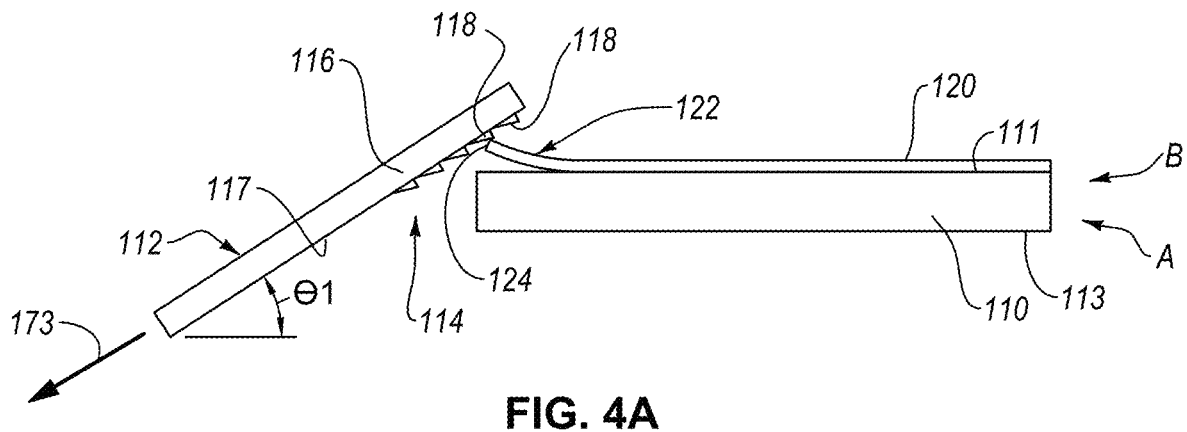
FIG. 4A is a schematic side elevation view of the edge-engagement tool of FIG. 1, shown with the edge-engagement tool in a fourth stage of motion, according to one or more examples of the present disclosure.
Figure 4B:
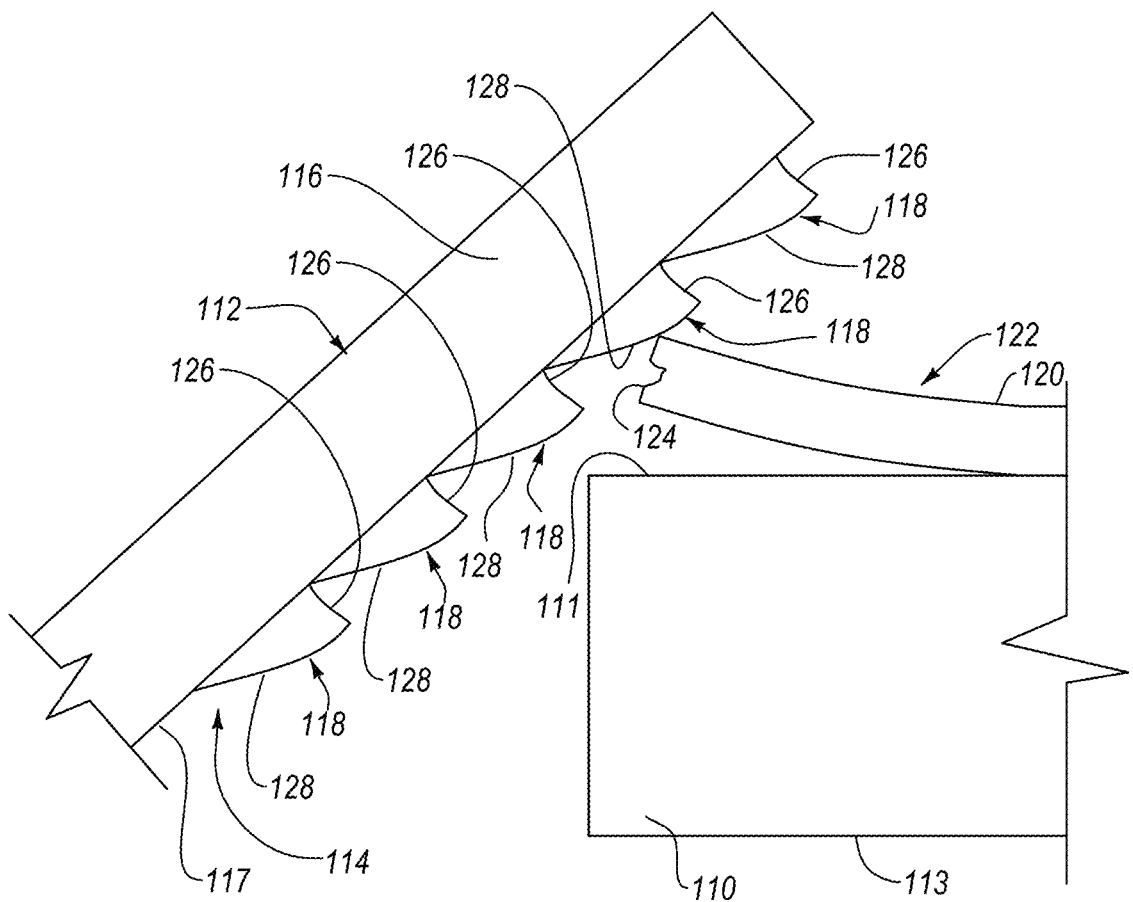
FIG. 4B is a schematic, side elevation, enlarged view of a portion of the edge-engagement tool of FIG. 4A, according to one or more examples of the present disclosure.
Figure 5:
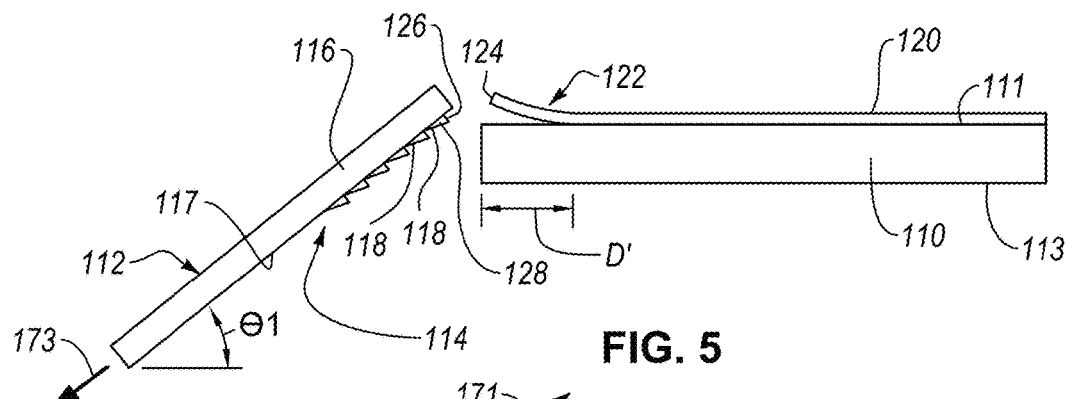
FIG. 5 is a schematic side elevation view of the edge-engagement tool of FIG. 1, shown with the edge-engagement tool in a fifth stage of motion, according to one or more examples of the present disclosure.
Figure 8:
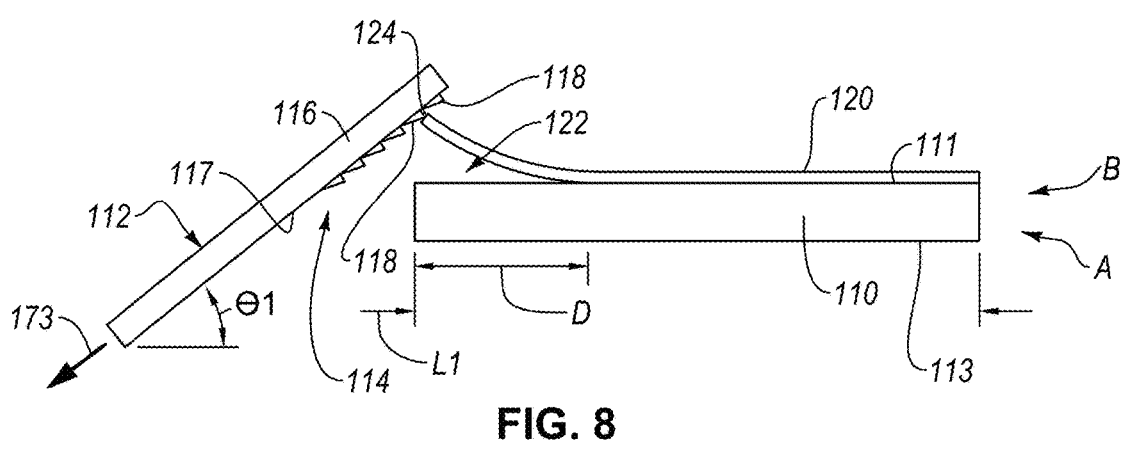
FIG. 8 is a schematic side elevation view of the edge-engagement tool of FIG. 1, shown with the edge-engagement tool in an eighth stage of motion, according to one or more examples of the present disclosure.

After the plate 116 has moved in the forward direction 171 such that a desired number of the backing-engagement features 114 engage the leading edge 124 of the backing layer 120, the movement of the plate 116 is reversed. In other words, the plate 116 is moved in the backward direction 173, as shown in FIG. 8. As the plate 116 moves in the backward direction 173, the backing-engagement features 114 move along the end portion 122 of the backing layer 120 separated from the panel 110 without penetrating the backing layer 120. More specifically, the dull sides 128 of the protrusions 118 may contact, but not penetrate the backing layer 120 (as shown in FIG. 4B). In this manner, the separated portion of the backing layer 120 is not pressed down against the first broad surface 111, but remains separated, as the plate 116 moves in the backward direction 173. As shown in FIG. 5, the plate 116 continues to move in the backward direction 173 until the backing-engagement features 114 are clear of the separated portion of the backing layer 120.

Figure 6:
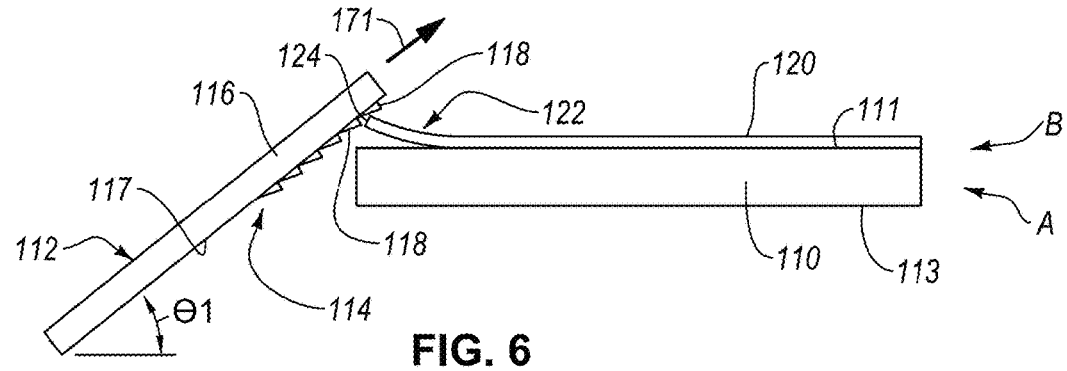
FIG. 6 is a schematic side elevation view of the edge-engagement tool of FIG. 1, shown with the edge-engagement tool in a sixth stage of motion, according to one or more examples of the present disclosure.
Figure 7:
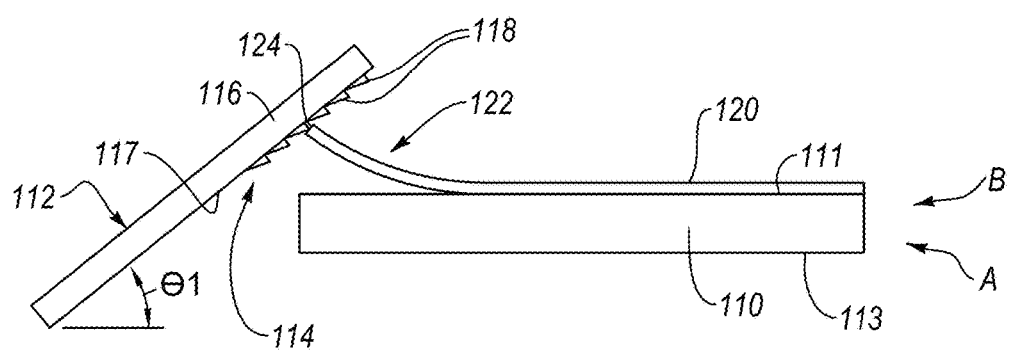
FIG. 7 is a schematic side elevation view of the edge-engagement tool of FIG. 1, shown with the edge-engagement tool in a seventh stage of motion, according to one or more examples of the present disclosure.

At least some of the edge portion 122 of the backing layer 120 remains separated from the panel 110 after a single pass of the plate 116 (i.e., movement of the plate 116 in the forward direction 171 and backward direction 173). In other words, the edge portion 122 is separated a distance D' away from the leading edge 124. However, if further separation of the edge portion 122 from the panel 110 is needed, one or more additional passes of the plate 116 can be performed. For example, as shown in FIGS. 6-8, a second pass of the plate 116 in the forward direction 171 and the backward direction 173 is performed to separate more of the edge portion 122 from the panel 110. In other words, the edge portion 122 is separated the distance D in FIG. 8, which is greater than the distance D' in FIG. 5. Such reciprocation of the plate 116, or multiple passes (i.e., at least two passes) of the plate 116, is performed until a desired separation of the edge portion 122 is achieved. The desired separation of the edge portion 122 corresponds with enough separation of the edge portion 122 that the gripper 130 can grip the separated portion of the backing layer 120 and remove the remaining non-separated portion of the backing layer 120 as described below.

Although the backing-engagement features 114 of the plate 116, in the illustrated examples, are protrusions having a particular shape, in other examples the backing-engagement features 114 can be protrusions having a different shape, such as a textured or rough surface formed on or attached to the plate 116. Alternatively, the backing-engagement features 114 are not protrusions, but can be a tacky film or other coating that frictionally engages the edge portion 122 of the panel 110 as the plate 116 moves in the forward direction 171.

Figure 9:
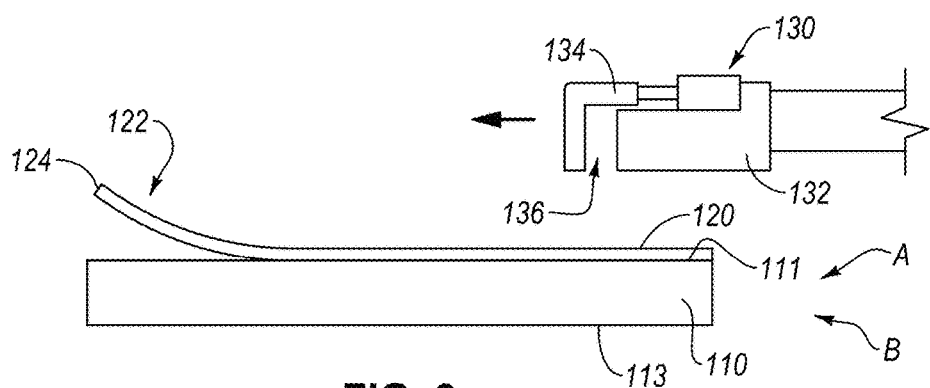
FIG. 9 is a schematic side elevation view of a gripper of an automated system for removing a backing layer from a panel, according to one or more examples of the present disclosure.
Figure 10:
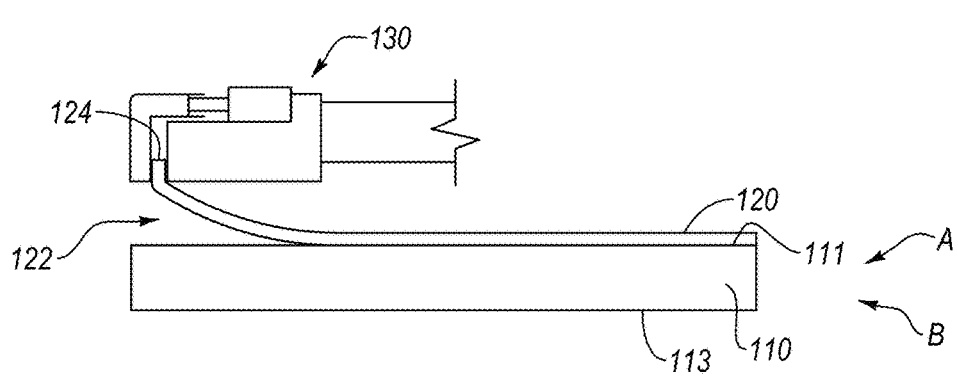
FIG. 10 is a schematic side elevation view of the gripper of FIG. 9, shown with the gripper gripping an edge portion of the backing layer, according to one or more examples of the present disclosure.
Figure 11:
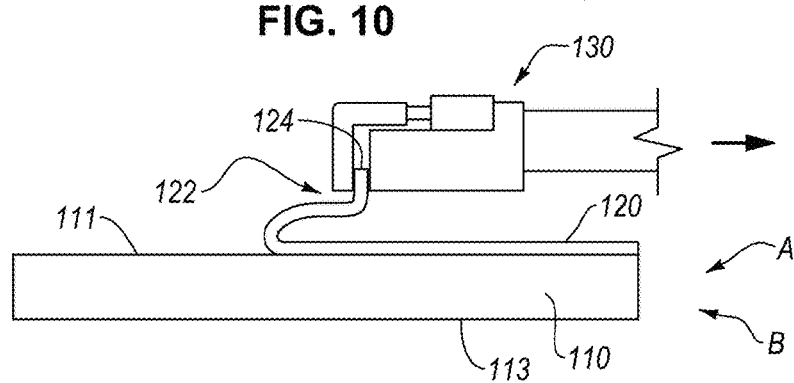
FIG. 11 is a schematic side elevation view of the gripper of FIG. 9, shown with the gripper gripping and pulling an edge portion of the backing layer, according to one or more examples of the present disclosure.
Figure 12:
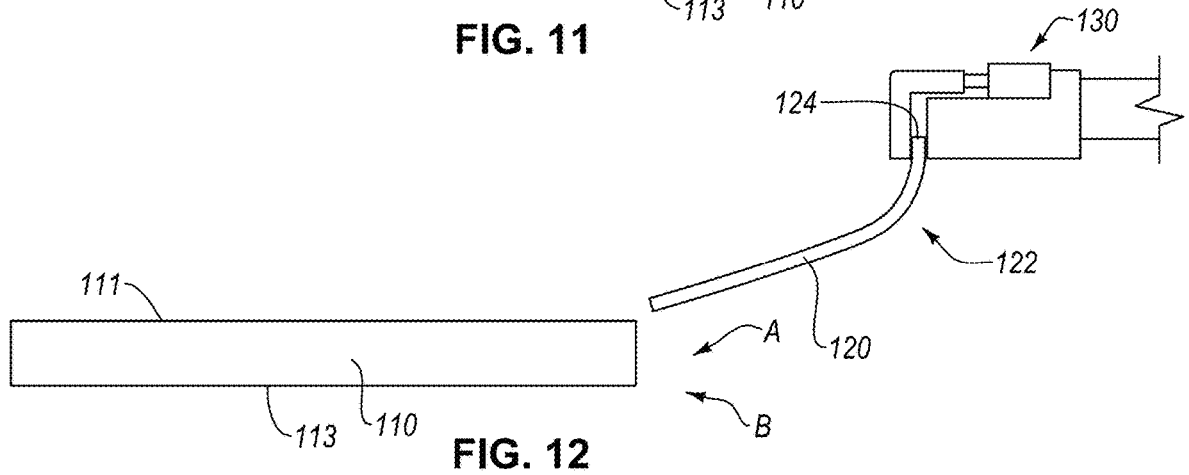
FIG. 12 is a schematic side elevation view of the gripper of FIG. 9, shown with the gripper gripping and removing the backing layer from the panel, according to one or more examples of the present disclosure.

After a desired separation of the edge portion 122 of the backing layer 120 is achieved by the edge-engagement tool 112, the separated portion of the backing layer 120 can be manually gripped and removed, or automatedly gripped and removed, by the gripper 130. Referring to FIGS. 9-12, and according to some examples, the gripper 130 is a pinching device that includes a base 132 and a finger 134. The finger 134 is actuatable toward and away from the base to close and open a receptacle 136 of the gripper 130. Moreover, the base 132 and the finger 134 are collectively movable relative to the panel 110. As shown in FIGS. 9 and 10, the gripper 130 is moved in a retrieval direction, as indicated by a directional arrow, relative to the panel 110 and positioned to receive part (e.g., the leading edge 124) of the separated portion of the backing layer 120 within the receptacle, when the receptacle is open. The finger 134 can then be moved toward the base 132 such that the receptacle 136 is closed and the separated portion of the backing layer 120 is pinched between the finger 134 and the base 132. When the separated portion of the backing layer 120 is pinched by the gripper 130, the gripper 130 can be moved relative to the panel 110, such as in a removal direction opposite the retrieval direction, as shown by the directional arrow in FIG. 11. As the gripper 130 moves in the removal direction, the backing layer 120 is peeled back and away from the panel 110. Eventually, as shown in FIG. 12, the entirety of the backing layer 120 is removed from the panel 110 by the gripper 130. The gripper 130 can then release the backing layer 120 and the backing layer 120 can be disposed of (e.g., recycled or reused).

Figure 13:
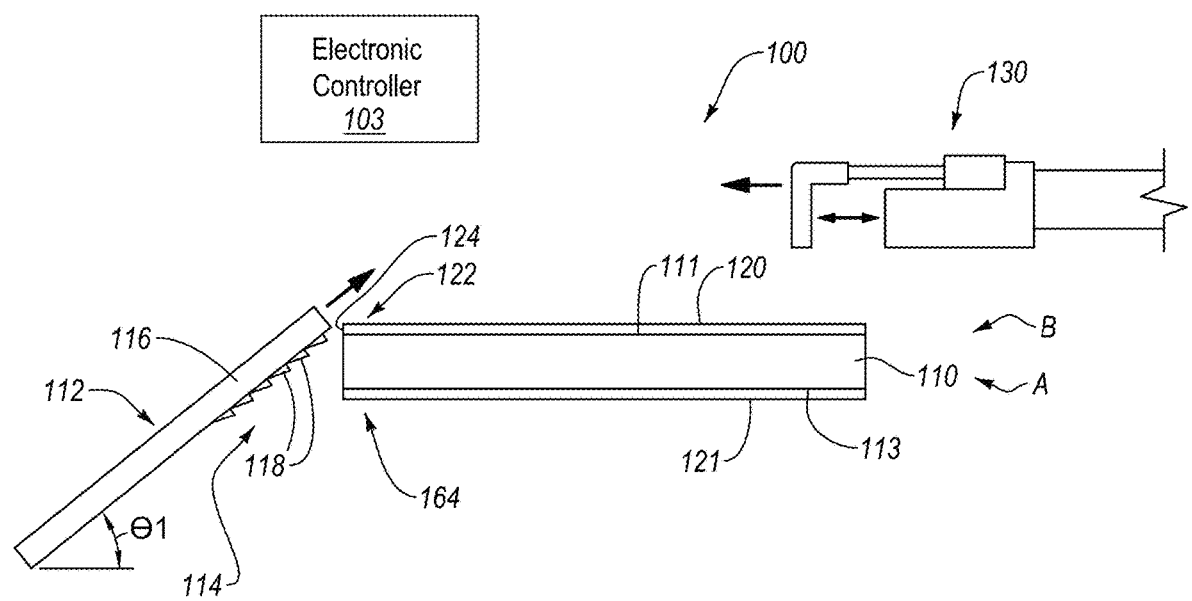
FIG. 13 is a schematic side elevation view of an automated system for removing a backing layer from a panel, according to one or more examples of the present disclosure.
Figure 14:
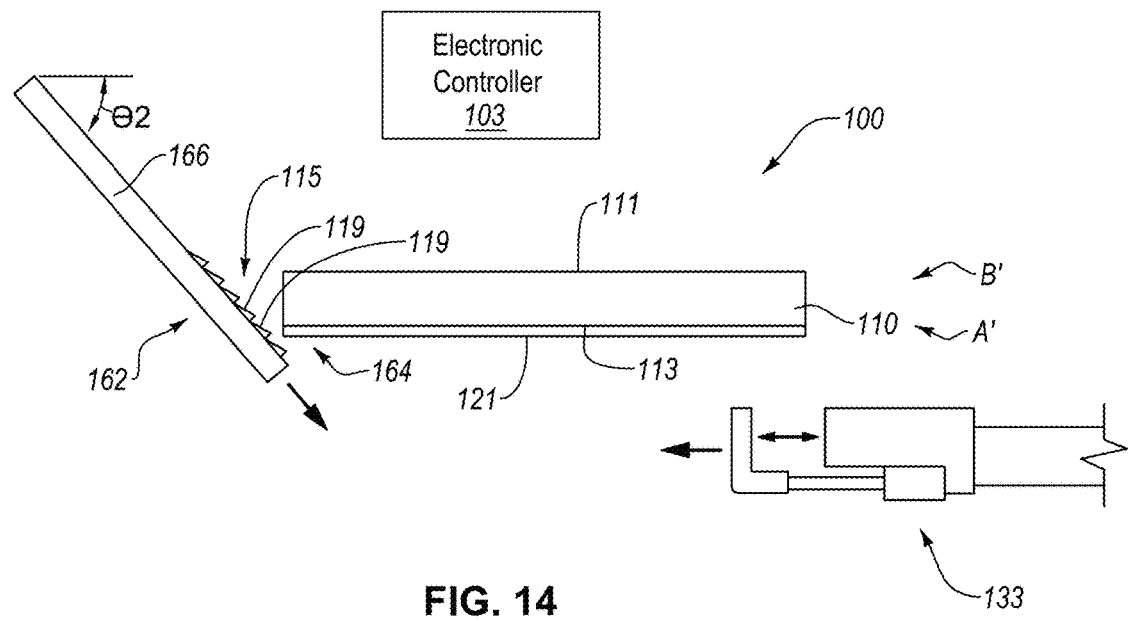
FIG. 14 is a schematic side elevation view of an automated system for removing a backing layer from a panel, according to one or more examples of the present disclosure.

In some examples, the automated system 100 is configured to remove the backing layer from both sides of a panel. According to one example, the automated system 100 is configured to flip the panel 110 (such as 180°), after the backing layer 120 is removed from the first broad surface 111 of the panel 110, and the same plate 116 used to remove the backing layer 120 from the first broad surface 111 is used to remove a second backing layer 121 from the second broad surface 113. Alternatively, the panel 110 is not flipped, but the plate 116 is repositioned or reoriented before removing the second backing layer 121. However, in certain examples, as shown in FIGS. 13 and 14, a second edge-engagement tool 162 is used to separate the second backing layer 121 from the second broad surface 113 of the panel 110. The second edge-engagement tool 162 is similar to the edge-engagement tool 112. For example, the second edge-engagement tool 162 includes a plate 166 (e.g., second-tool plate) and backing engagement features 115, which can be protrusions 119. The panel 110 can be positioned and oriented relative to the plate 166 (e.g., in a second backing-separation position B' and a second backing-separation orientation A' as shown in FIG. 14), and the plate 166 can be moved (e.g., reciprocated) relative to the panel 110, in a manner similar to the plate 116, to separate an edge portion 164 of the second backing layer 121 from the second broad surface 113 of the panel 110.

In some examples, as shown in FIG. 14, the plate 166 is angled relative to the plate 116, and the second backing-separation orientation A' of the panel 110 is the same as the backing-separation orientation A of the panel 110, when the plate 166 is moved to separate the edge portion 164 of the second backing layer 121 from the second broad surface 113 of the panel 110. The angle between the plate 116 and the plate 166 is no more than 90°, in some examples, and less than 90°, in other examples. For example, the angle between the plate 116 and the plate 166 can be less than 45° or less than 30°. Such angles promote an efficient separation of the backing layer 120 and the backing layer 121 from the panel 110.

In contrast to the example shown in FIG. 14, in some examples, the plate 166 is co-planar with or parallel to the plate 116, and the second backing-separation orientation A' of the panel 110 is different than the backing-separation orientation A of the panel 110, when the plate 166 is moved to separate the edge portion 164 of the backing layer 121 from the second broad surface 113 of the panel 110. In such examples, the panel 110 can be flipped, such as by 180°, after the backing layer 120 is removed from the panel 110 and before the plate 166 separates the backing layer 121 from the panel 110. Accordingly, in some examples, the second backing-separation orientation A' of the panel 110 is different than the backing-separation orientation A of the panel 110 by 1800.

Referring to FIG. 14, the automated system 100 further includes a second gripper 133 that is similar to (e.g., has the same features as) the gripper 130. After the edge portion 164 of the second backing layer 121 is separated from the second broad surface 113 of the panel 110. The second gripper 133 is movable in a retrieval direction, as indicated by a directional arrow, and actuatable to grip the edge portion 164. After gripping the edge portion 164, the second gripper 133 can be moved in a removal direction, opposite the retrieval direction, to peel the backing layer 121 back and away from the panel 110 until the backing layer 121 is entirely removed from the panel 110. The second gripper 133 can then release the backing layer 121 and the backing layer 121 can be disposed of.

As shown in FIGS. 15-18, in some examples, the edge-engagement tool 112 includes a wheel 150 and the backing-engagement features 114 include a plurality of teeth 152. The teeth 152 are spaced apart circumferentially about the wheel 150, which can be elongated in a direction parallel with an axis 154 of the wheel 150. In some examples, the wheel 150 has a width that is at least as wide as the width W1 of the panel 110. Additionally, in some examples, the teeth 152 are elongated such that each one of the teeth 152 extends along an entirety of the width of the wheel 150. The wheel 150 rotates about the axis 154 in a rotational direction, as indicated by directional arrow. Each one of the teeth 152 includes a sharp side that faces in the rotational direction. The sharp side of each one of the teeth 152 is configured to grab, pierce, or penetrate the backing layer 120.

Figure 15:
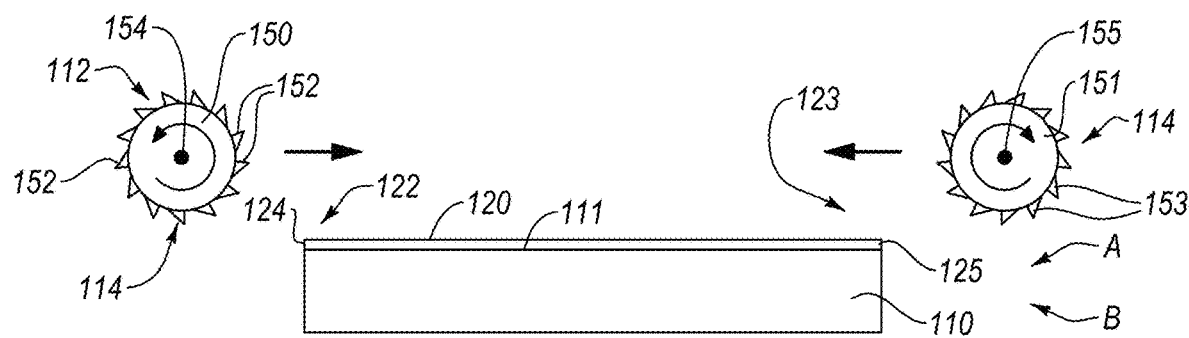
FIG. 15 is a schematic side elevation view of an edge-engagement tool of an automated system for removing a backing layer from a panel, shown with the edge-engagement tool in a first stage of motion, according to one or more examples of the present disclosure.
Figure 16:
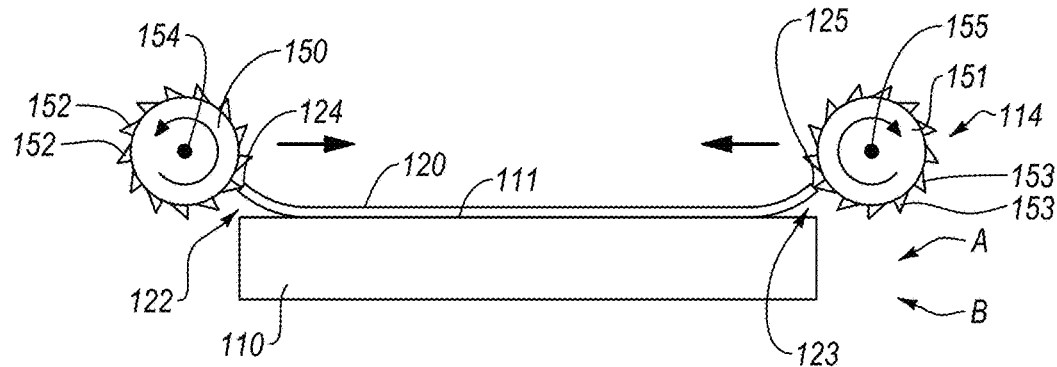
FIG. 16 is a schematic side elevation view of the edge-engagement tool of FIG. 15, shown with the edge-engagement tool in a second stage of motion, according to one or more examples of the present disclosure.
Figure 17:
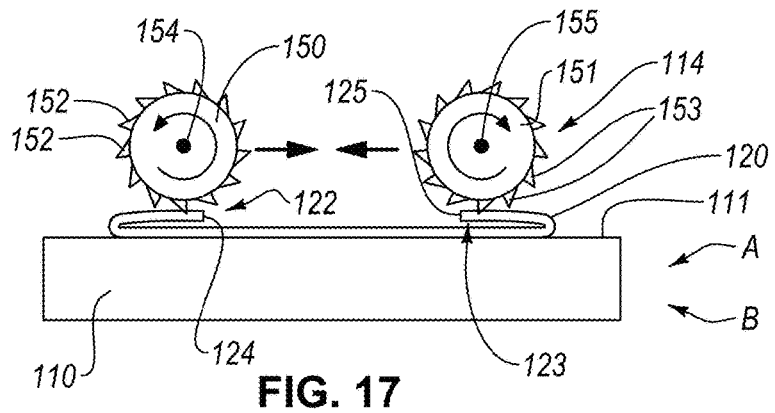
FIG. 17 is a schematic side elevation view of the edge-engagement tool of FIG. 15, shown with the edge-engagement tool in a third stage of motion, according to one or more examples of the present disclosure.
Figure 18:
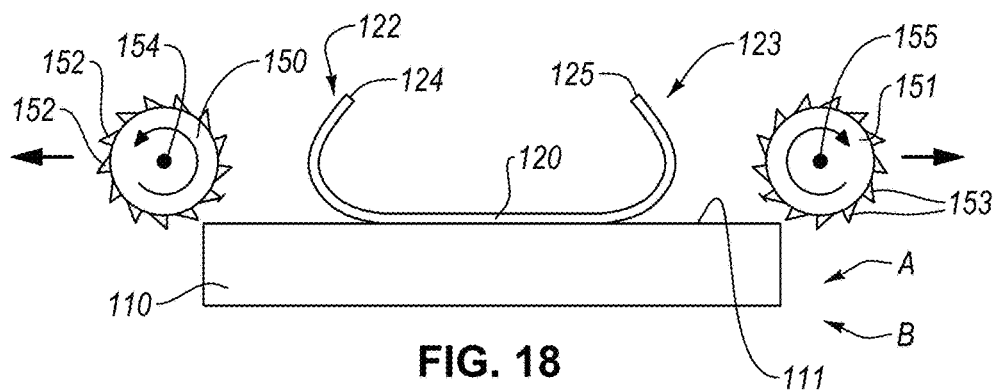
FIG. 18 is a schematic side elevation view of the edge-engagement tool of FIG. 15, shown with the edge-engagement tool in a fourth stage of motion, according to one or more examples of the present disclosure.
Figure 19:
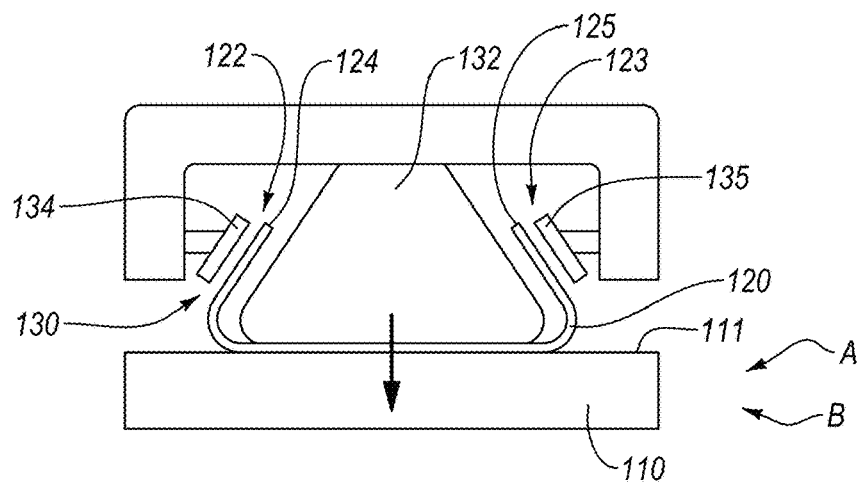
FIG. 19 is a schematic side elevation view of a gripper of an automated system for removing a backing layer from a panel, according to one or more examples of the present disclosure.
Figure 20:
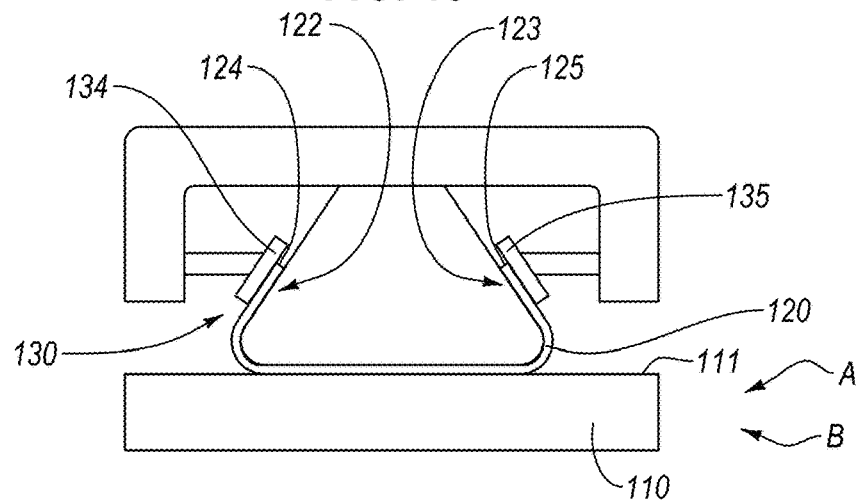
FIG. 20 is a schematic side elevation view of the gripper of FIG. 19, shown with the gripper gripping edge portions of the backing layer, according to one or more examples of the present disclosure.

With the panel 110 in the backing-separation orientation A and positioned in the backing-separation position B, the wheel 150 is rotatable about the axis 154 and translationally movable toward the panel 110, as shown in FIG. 15. The wheel 150 is positioned relative to the panel 110, such that as the wheel 150 moves into a position above the panel 110 (see, e.g., FIG. 16), the teeth 152 of the wheel 150 engage only the leading edge 124 and edge portion 122 of the backing layer 120. As the wheel rotates, the teeth 152 of the wheel 150 repeatedly engage the edge portion 122 of the backing layer 120. Moreover, because the teeth 152 are being rotated upward and away from the panel 110 after engaging the backing layer 120, the edge portion 122 is effectively lifted and separated away from the first broad surface 111 of the panel 110. Further translational movement of the wheel 150 along the panel 110 results in further engagement of the teeth 152 with the edge portion 122 and separation of additional portions of the edge portion 122 (see, e.g., FIG. 17) until a desired amount of the edge portion 122 is separated from the panel 110 (see, e.g., FIG. 18). After the desired amount of the edge portion 122 is separated from the panel 110, the wheel 150 is retracted away from the separated portion of the edge portion 122, as indicated by directional arrow in FIG. 18.

Figure 21:
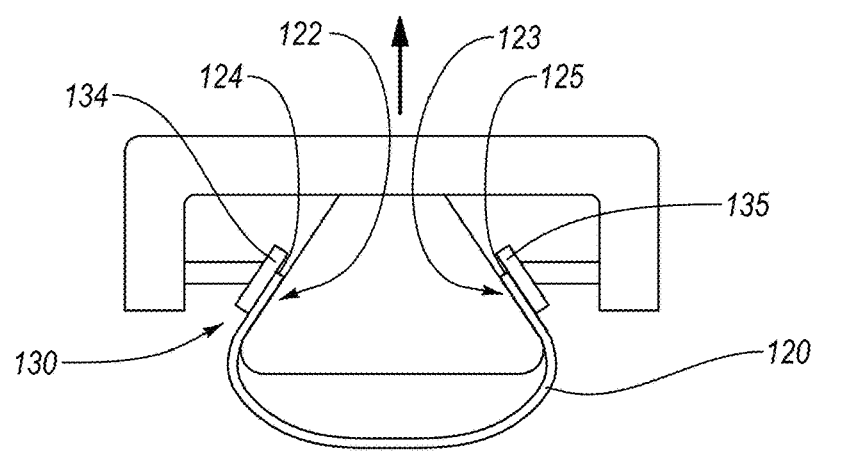
FIG. 21 is a schematic side elevation view of the gripper of FIG. 19, shown with the gripper gripping and removing the backing layer from the panel, according to one or more examples of the present disclosure.

With the wheel 150 retracted away from the panel 110, the separated portion of the backing layer 120 can be manually gripped and removed, or automatedly gripped and removed, by the gripper 130. For example, the gripper 130 is moved in a retrieval direction, as indicated by a directional arrow in FIG. 19, which can be perpendicular relative to the panel 110, and positioned to receive part (e.g., the leading edge 124) of the separated portion of the backing layer 120. The finger 134 can then be moved toward the base 132 such that the backing layer 120 is pinched between the finger 134 and the base 132 (see, e.g., FIG. 20). When the separated portion of the backing layer 120 is pinched by the gripper 130, the gripper 130 can be moved relative to the panel 110, such as in a removal direction opposite the retrieval direction, as shown by the directional arrow in FIG. 21. As the gripper 130 moves in the removal direction, the backing layer 120 is peeled away from the panel 110. Eventually, as shown in FIG. 21, the entirety of the backing layer 120 is removed from the panel 110 by the gripper 130. The gripper 130 can then release the backing layer 120 and the backing layer 120 can be disposed of (e.g., recycled or reused).

Referring back to FIGS. 15-18, in some examples, the edge-engagement tool 112 includes a second wheel 151 and the backing-engagement features 114 include a plurality of second teeth 153. The second wheel 151 is similar to the wheel 150. For example, the second teeth 153 are spaced apart circumferentially about the second wheel 151, which can be elongated in a direction parallel with an axis 155 of the second wheel 151. In some examples, the second wheel 151 has a width that is at least as wide as the width W1 of the panel 110. Additionally, in some examples, the teeth 153 are elongated such that each one of the second teeth 153 extends along an entirety of the width of the second wheel 151. The second wheel 151 rotates about the axis 155 in a second rotational direction, as indicated by directional arrow, which is opposite the rotational direction of the wheel 150. Each one of the second teeth 153 includes a sharp side that faces in the second rotational direction. The sharp side of each one of the teeth 152 is configured to grab, pierce, or penetrate the backing layer 120.

With the panel 110 in the backing-separation orientation A and positioned in the backing-separation position B, the second wheel 151 is rotatable about the axis 155 and translationally movable toward the panel 110 and the wheel 150, as shown in FIG. 15. The second wheel 151 is positioned relative to the panel 110, such that as the second wheel 151 moves into a position above the panel 110 (see, e.g., FIG. 16), the teeth 153 of the second wheel 151 engage only the trailing edge 125 and the second edge portion 123 of the backing layer 120. As the second wheel rotates, the teeth 153 of the second wheel 151 repeatedly engage the second edge portion 123 of the backing layer 120. Moreover, because the teeth 152 are being rotated upward and away from the panel 110 after engaging the backing layer 120, the second edge portion 123 is effectively lifted and separated away from the first broad surface 111 of the panel 110. Further translational movement of the second wheel 151 along the panel 110 results in further engagement of the second teeth 153 with the second edge portion 123 and separation of additional portions of the edge portion 123 (see, e.g., FIG. 17) until a desired amount of the second edge portion 123 is separated from the panel 110 (see, e.g., FIG. 18). After the desired amount of the second edge portion 123 is separated from the panel 110, the second wheel 151 is retracted away from the separated portion of the second edge portion 123, as indicated by directional arrow in FIG. 18.

With the wheel 150 and the second wheel 151 retracted away from the panel 110, the separated portions of the backing layer 120 can be manually gripped and removed, or automatedly gripped and removed, by the gripper 130. For example, the gripper 130 can have a second finger 135 that is actuatable relative to the base 132. The second finger 135 can then be moved toward the base 132 such that the separated portion of the second edge portion 123 is pinched between the second finger 135 and the base 132 (see, e.g., FIG. 20). When both separated portions of the backing layer 120 are pinched by the gripper 130, the gripper 130 can be moved relative to the panel 110, such as in a removal direction opposite the retrieval direction, as shown by the directional arrow in FIG. 21.

Figure 40:
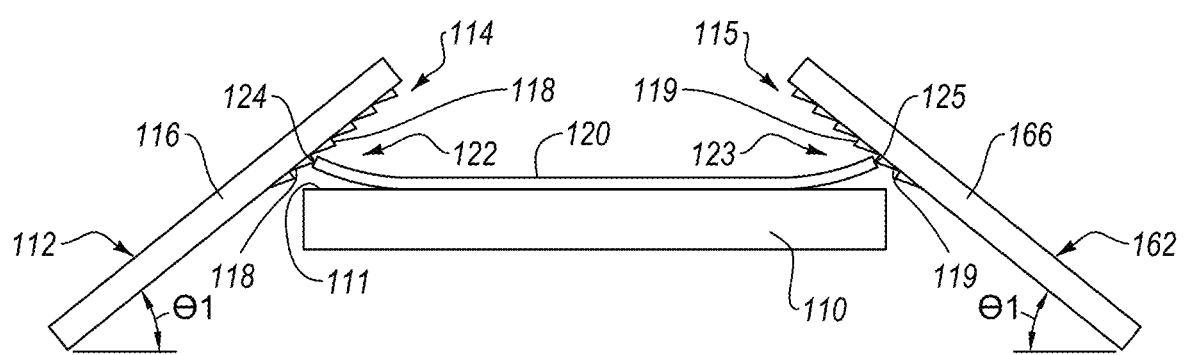
FIG. 40 is a schematic side elevation view of an edge-engagement tool of an automated system for removing a backing layer from a panel, according to one or more examples of the present disclosure.

Similar to FIG. 15, in which two wheels are used to separate the edge portion 122 and the second edge portion 123 of the backing layer 120, according to some examples, as shown in FIG. 40, two plates can be used to separate the edge portion 122 and the second edge portion 123 of the backing layer 120. More specifically, the plate 116 of the edge-engagement tool 112 can be moved relative to the panel 110 to separate the edge portion 122 of the backing layer 120 from the panel 110, as disclosed above, and the plate 166 of the second edge-engagement tool 162 can be moved relative to the panel 110, concurrently with the plate 116 in certain examples, to separate the second edge portion 123 of the backing layer 120. In this manner, two plates, and the corresponding backing-engagement features, can be moved (e.g., reciprocated) to separate opposite edge portions of the same backing layer at the same time.

In some examples, the panel 110 is a quasi-isotropic panel and after the backing layer 120 is removed by the gripper 130, the panel 110 receives the elongated strips 145 to transform the quasi-isotropic panel into a cluster panel.

Figure 22:
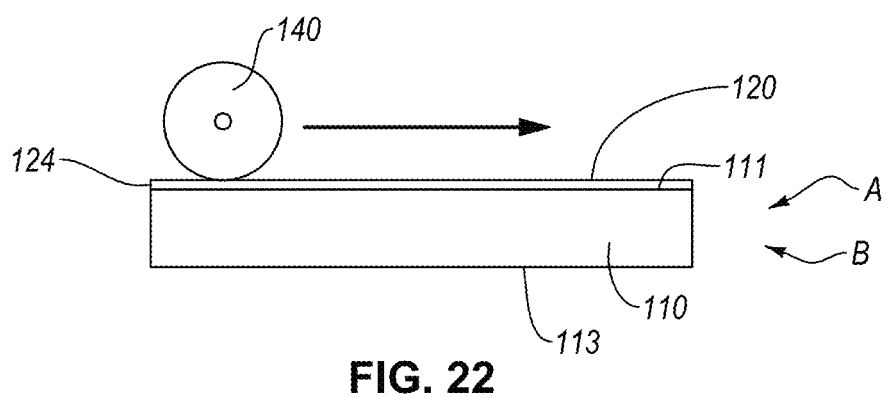
FIG. 22 is a schematic side elevation view of a roller of an automated system for removing a backing layer from a panel, according to one or more examples of the present disclosure.

In some examples, as shown in FIG. 22, the automated system 100 additionally includes at least one roller 140. The roller 140 is selectively automatically operable to roll along the backing layer 120 when the backing layer 120 is adhesively secured to the broad surface 111 of the panel 110. Accordingly, the roller 140 rolls along the backing layer 120 before the backing layer 120 is separated by the edge-engagement tool 112 and removed by the gripper 130. Rolling the roller 140 along the backing layer 120 compresses the backing layer 120 against the broad surface 111, which promotes a flush engagement between the backing layer 120 and the broad surface 111 of the panel 110 and helps to eliminate undulations in the panel 110 and backing layer 120 and to reduce air pockets between the backing layer 120 and the panel 110. Although one roller 140 is shown, the automated system 100 can include a second roller that rolls along a second backing layer 121 secured to the second broad surface 113 of the panel 110 before the second backing layer 121 is separated and removed from the panel 110.

Figure 29:
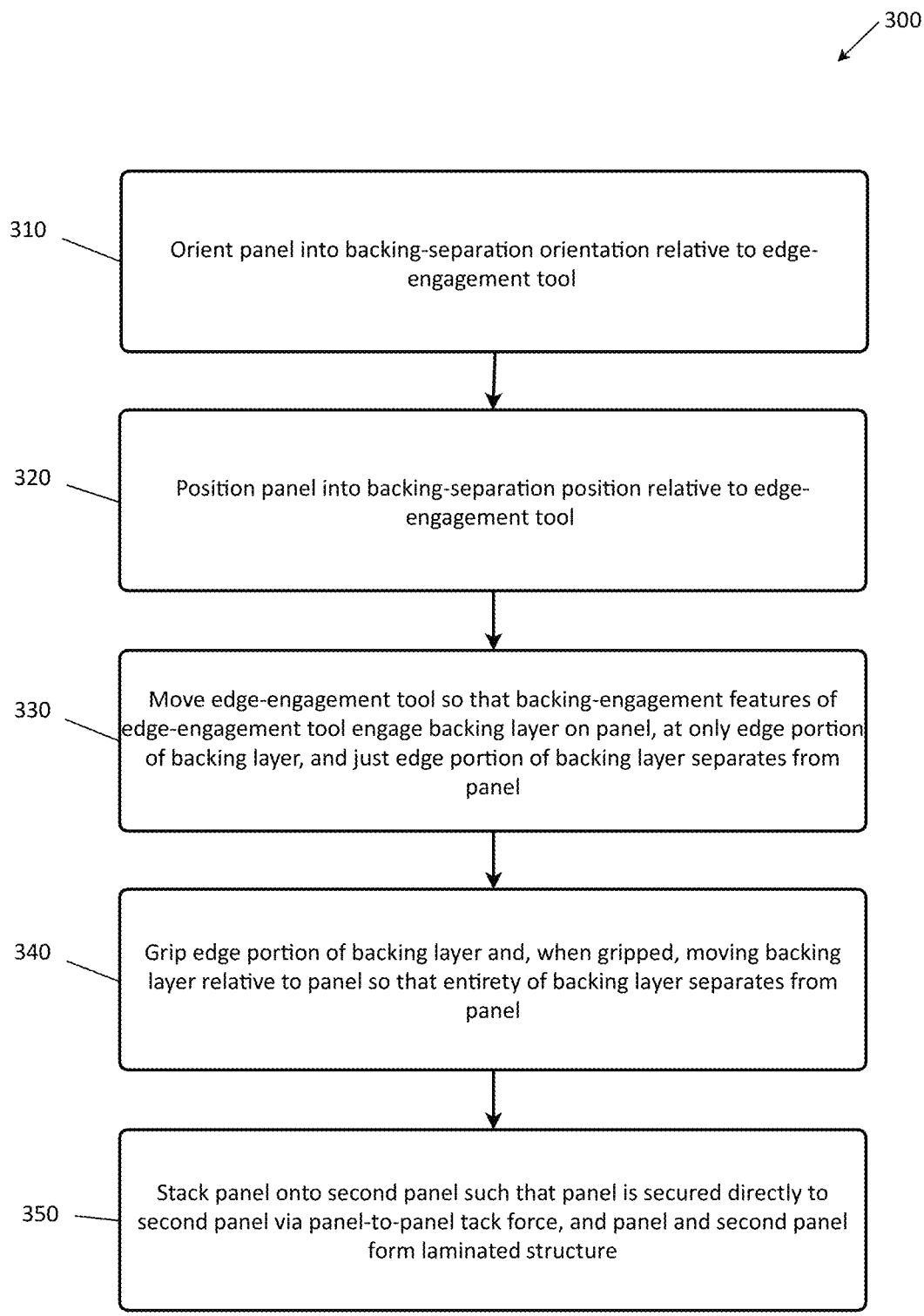
FIG. 29 is a schematic flow chart of a method of forming a laminated structure, according to one or more examples of the present disclosure.

Referring to FIG. 29, according to some examples, a method 300 of forming the laminated structure 180, using the automated system 100, includes (block 310) orienting the first panel 110, and the backing layer 120 secured to the first panel 110, into the backing-separation orientation A, relative to the edge-engagement tool 112. The method 300 additionally includes (block 320) positioning the panel 110 into the backing-separation position B, relative to the edge-engagement tool 112. The method 300 also includes (block 330) moving the edge-engagement tool 112, relative to the first panel 110 and when the first panel 110 is in the backing-separation orientation A and the backing-separation position B, so that the backing-engagement features 114 of the edge-engagement tool 112 engage the backing layer 120, at only the edge portion 122 of the backing layer 120, and just the edge portion 122 of the backing layer 120 separates from the first panel 110. According to some examples, a temperature of the panel 110 is maintained below a predetermined temperature (such as room temperature or between 66° F. and 72° F. (e.g., 68° F.)). Maintaining the temperature of the panel 110 at or below the predetermined temperature is accomplished by blowing air 168, such as from a blower 169 (see, e.g., FIG. 1), that has a temperature at or below the predetermined temperature. The method 300 further includes (block 340) gripping the edge portion 122 of the backing layer 120, after the edge portion 122 separates from the first panel 110, and, when gripped, moving the backing layer 120 relative to the panel 110 so that an entirety of the backing layer 120 separates from the broad surface 111 of the first panel 110. As shown in FIG. 30A, the method 300 additionally includes (block 350) stacking the first panel 110 onto the second panel 184, such that the first panel 110 is secured directly to the second panel 184 via panel-to-panel tack force between the pre-impregnated fiber reinforced polymer of the first panel 110 and the pre-impregnated fiber reinforced polymer of the second panel 184, and the first panel 110 and the second panel 184 form, at least part of, the laminated structure 180.

Referring to FIG. 30B, in some examples, the laminated structure 180 includes a plurality of panels 110, some of which include one of a plurality of clusters 165, that are stacked together as shown, according to block 350 of the method 300. In some examples, each one of the clusters 165 is applied onto a corresponding one of the panels 110, to form part of the panels, before the panels are stacked together. As shown, the laminated structure 180 can include a plurality of panels 110, some with clusters 165, where each one of the panels includes multiple plies. As such, in some examples, the laminated structure 180 can include a significant number of plies, such as at least 10 plies, in certain examples, at least 60 plies, in other examples, and between 20 and 80 plies, in yet further examples. The thickness of each ply can be such that a total thickness of the laminated structure 180 is between 3 mm and 6.5 mm. Moreover, because some laminated structures are formed from many panels, each having at least one backing layer adhesively attached thereto prior to being stacked together, a backing layer removal process, which does not degrade the quality of the panels, may need to be performed many times for a single laminated structure. The automated system 100 and corresponding method 300 of the present disclosure, which enable removal of multiple backing layers from multiple panels in a clean, controlled, and efficient manner, are particularly useful for assembling laminated structures made from multiple panels. In certain examples, other panels, such as a fiberglass ply 187, made of a fiberglass material, a single ply 189, made of a fiber-reinforced polymer other than fiberglass, and a second fiberglass ply 191, made of a fiberglass material, can be stacked with the panels 110 and clusters 165 as shown.

In some examples, the method 300 additionally includes automatedly separately applying the elongated strips 145 onto the first stack 161, at different angles relative to each other, to form the cluster 165 of the second stack 163. Automatedly separately applying the elongated strips 145 can include, while maintaining an orientation of the elongated strips 145, incrementally rotating the first stack 161 relative to the elongated strips 145. Accordingly, in some examples, the step of automatedly separately applying the elongated strips 145 onto the first stack 161 comprises, while maintaining an orientation of the elongated strips 145, incrementally rotating the first stack 161 relative to the elongated strips 145.

Referring to FIG. 1, the method 300 additionally, or alternatively, includes of adjusting a distance, in a stacked direction 167 that is perpendicular to the broad surface 111 when the first panel 110 is stacked onto the second panel 184, between the edge-engagement tool 112 and the second panel 184 prior to the step of moving the edge-engagement tool 112. As panels are stacked onto each other, the height of the laminated structure 180 changes. To compensate for the adjustment to the height of the laminated structure 180, and ensure the edge-engagement tool 112 is properly positioned to engage only the backing layer 120 on the panel at the top of the laminated structure, the position of the edge-engagement tool 112 is adjusted. Each adjustment of the position of the edge-engagement tool 112 can be equal to a thickness of the panel added to the stack of panels forming the laminated structure 180.

Figure 31:
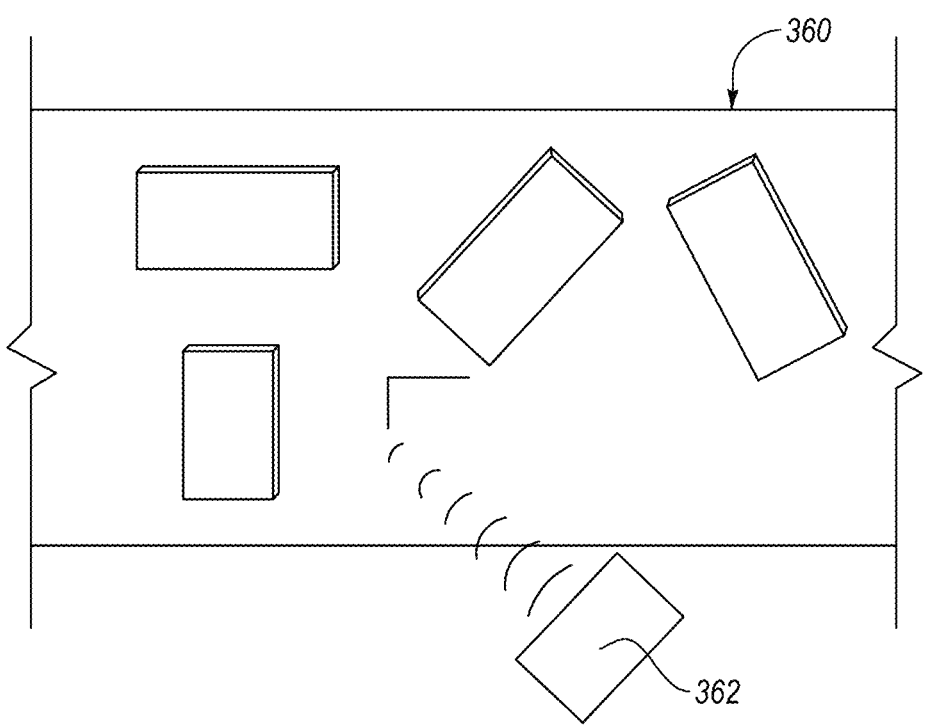
FIG. 31 is a schematic, isotropic view of a sheet of pre-impregnated reinforced polymer and plies being removed therefrom, according to one or more examples of the present disclosure.

In some examples, the method 300 further includes steps for forming each of the panels before stacking them. For example, the method 300 can include ultrasonically cutting a sheet 360, made of the pre-impregnated fiber-reinforced polymer, into the plurality of plies 129 using a cutter 362, which can be an ultrasonic cutter 362 (see, e.g., FIG. 31), stacking a first set of the plurality of plies 129 (e.g., a first ply 129A, a second ply 129B, a third ply 129C, and a fourth ply 129D) to form the first panel 110, and stacking a second set of the plurality of plies 129 (e.g., a first ply 129A, a second ply 129B, a third ply 129C, and a fourth ply 129D) to form the second panel 184 (see, e.g., FIG. 32).

Figure 33:
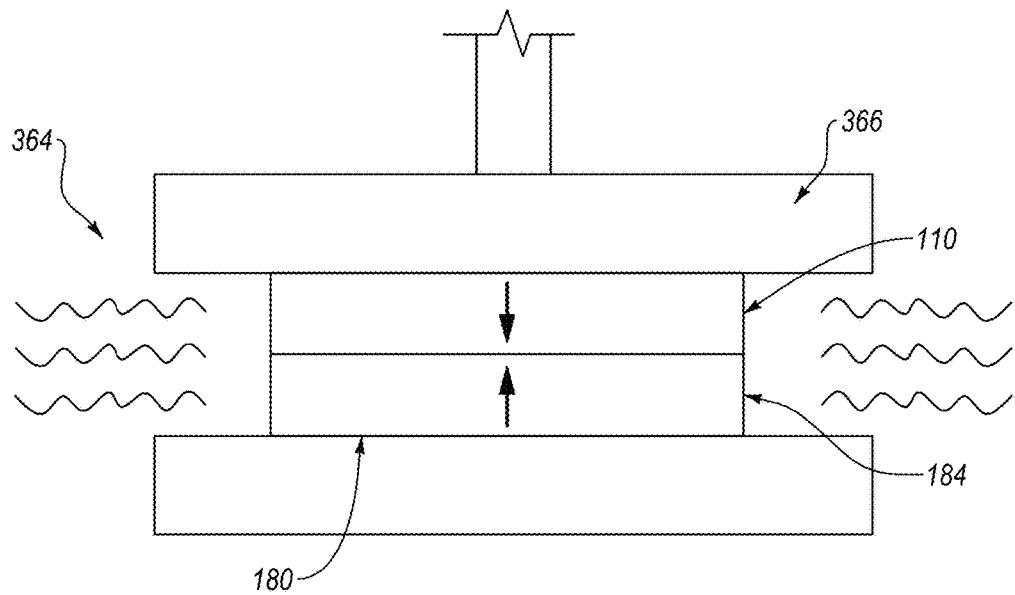
FIG. 33 is a schematic, isotropic view of a first panel and a second panel being compressed together and heated, according to one or more examples of the present disclosure.

After stacking the first and second panels, in some examples, the method 300 also includes compressing, using a compression device 366 (such as a compression molding device), and heating, with heat 364, the first panel 110 and the second panel 184 such that the pre-impregnated fiber-reinforced polymer is cured (see, e.g., FIG. 33). The compression molding device, in some examples, includes molds that shape the panels into a desired final shape.

Figure 34:
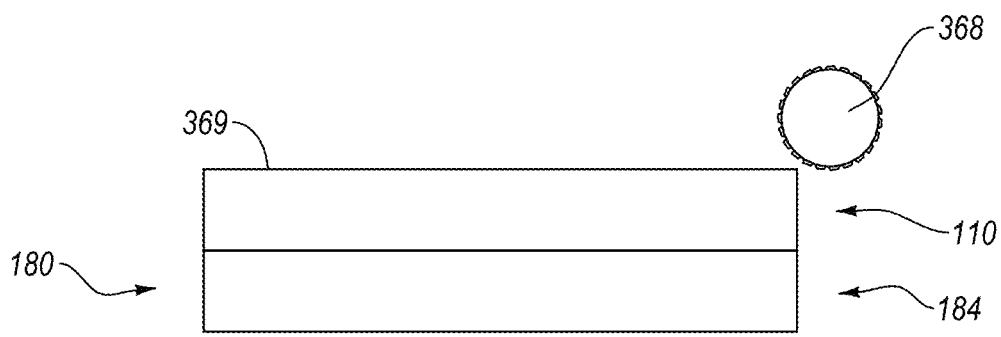
FIG. 34 is a schematic, isotropic view of the first panel of FIG. 33 being surface roughened, according to one or more examples of the present disclosure.
Figure 35:
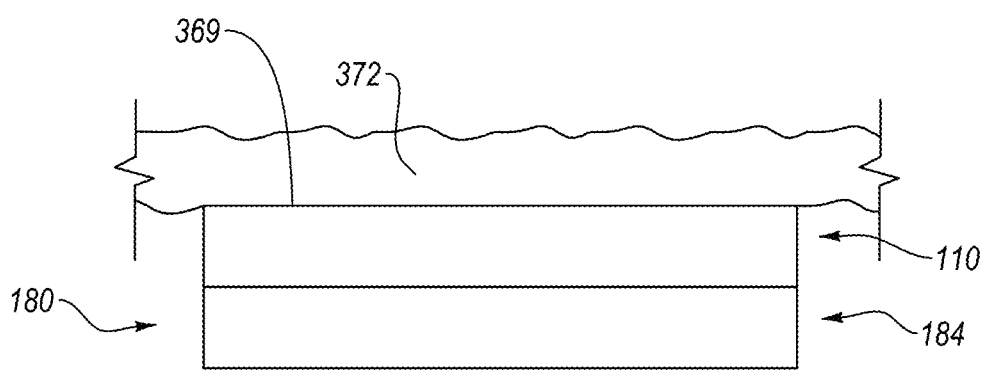
FIG. 35 is a schematic, isotropic view of the first panel of FIG. 34 being cleaned, according to one or more examples of the present disclosure.
Figure 36:
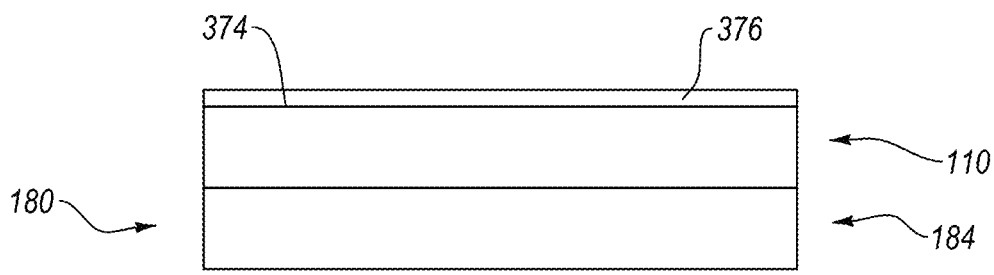
FIG. 36 is a schematic, isotropic view of the first panel of FIG. 35 and a primer layer applied onto the first panel, according to one or more examples of the present disclosure.
Figure 37:
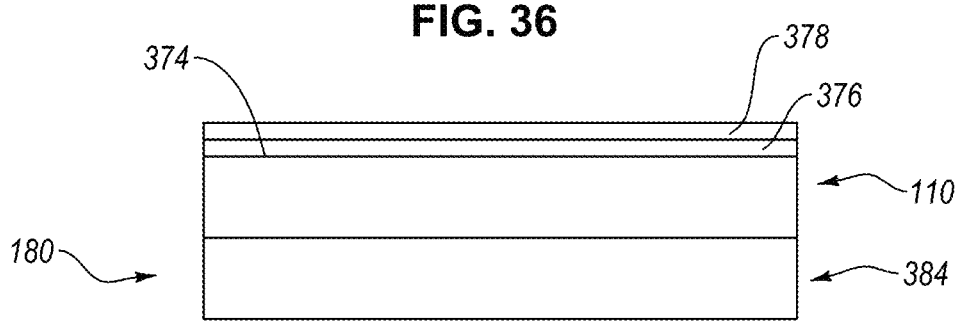
FIG. 37 is a schematic, isotropic view of the first panel and primer layer of FIG. 36 and an ink applied onto the primer layer, according to one or more examples of the present disclosure.

After curing the first panel 110 and the second panel 184, the method 300 can include the steps of roughening an outer surface (e.g., one of the broad surfaces) of one of the first panel 110 or the second panel 184, such as with a surface roughening device 368 (e.g., grinder), to form a roughened outer surface 369 (see, e.g., FIG. 34), cleaning the roughened outer surface 369, such as with a cleaning agent 372 (e.g., water or chemical), to form a cleaned-roughened outer surface 374 (see, e.g., FIG. 35), applying a primer layer 376 onto the cleaned-roughened outer surface 374 (see, e.g., FIG. 36), and applying ink 378 onto the primer layer 376 (see, e.g., FIG. 37). Applying the primer layer 376 and the ink 378 can be executed as a single step, such as where the ink 378 is capable of performing as a primer layer. In some examples, the step of applying the primer layer 376 and/or applying the ink 378 can be accomplished in a manner similar to that disclosed in U.S. Patent Application Publication No. 2014/0274446, published Sep. 18, 2014, which is incorporated herein by reference in its entirety. In one example, the ink 378 includes indicia of alignment aids or additional color contrasts or images that are printed on one of the outer surfaces of the first panel 110 or the second panel 184 using halftone printing, relief printing, thermal transfer printing, ink-jet printing, pad printing or other techniques, which are described more fully in U.S. patent application Ser. No. 14/210,000, filed on Mar. 13, 2014, which is incorporated herein by reference in its entirety. Additionally, or alternatively, the ink 378 includes indicia of alignment aids or additional color contrasts or images that are printed on one of the outer surfaces of the first panel 110 or the second panel 184 using inkjet printing, single pass inkjet printing or other techniques, which are described more fully in U.S. patent application Ser. No. 17/156,205, filed on Jan. 22, 2021, U.S. Patent Application No. 62/965,129, filed on Jan. 23, 2020, and U.S. Patent Application No. 63/066,033, filed on Aug. 14, 2020, which are incorporated herein by reference in their entirety.

Figure 38:
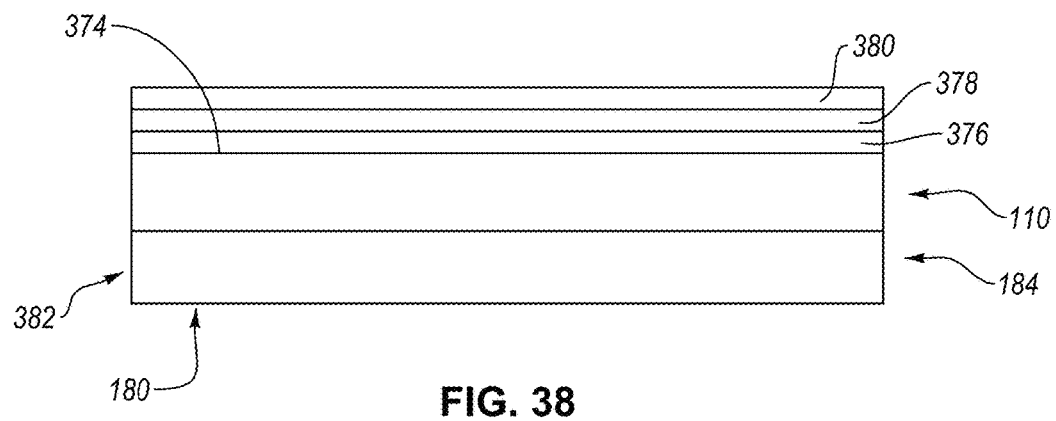
FIG. 38 is a schematic, isotropic view of the first panel, primer layer, and ink of FIG. 37 and a polymeric layer applied onto the ink to form a pre-cut laminated structure, according to one or more examples of the present disclosure.
Figure 39:
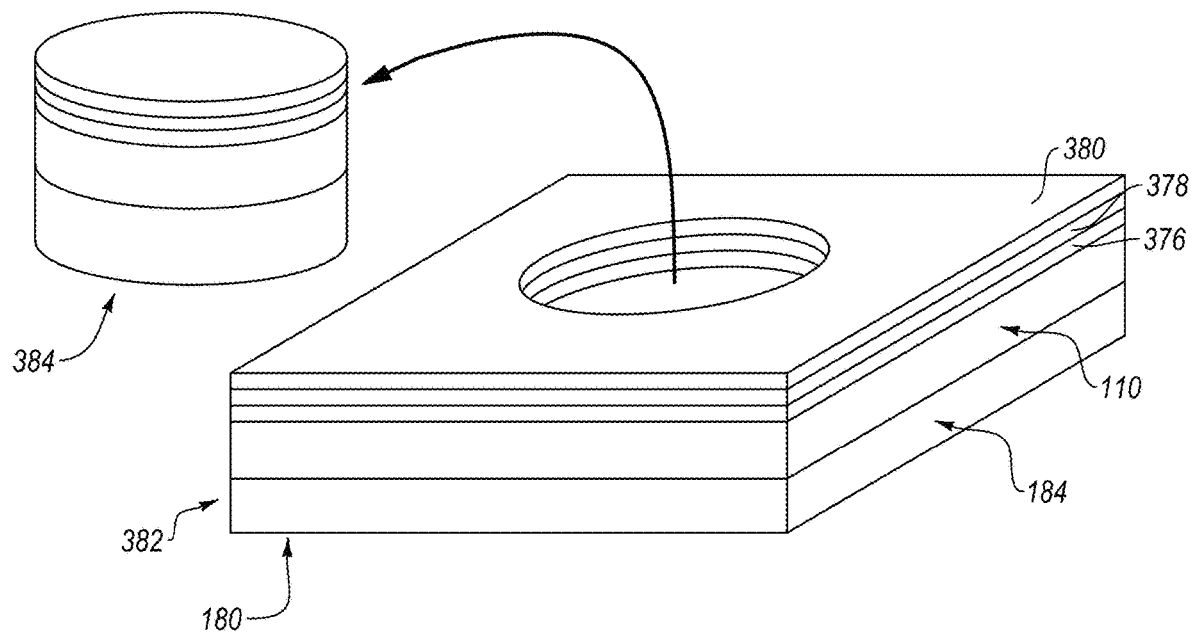
FIG. 39 is a schematic, isotropic view of a cut laminated structure cut from the pre-cut laminated structure of FIG. 38, according to one or more examples of the present disclosure.

After applying the ink 378 onto the primer layer 376, in some examples, the method 300 additionally includes compression molding a polymeric layer 380 onto the primer layer 376 and over the ink 378 to form a pre-cut laminated structure 382 (see, e.g., FIG. 38). The method 300 additionally includes, in some examples, cutting the pre-cut laminated structure 382 to form a cut laminated structure 384 having a predefined shape (see, e.g., FIG. 39).

Figure 28:
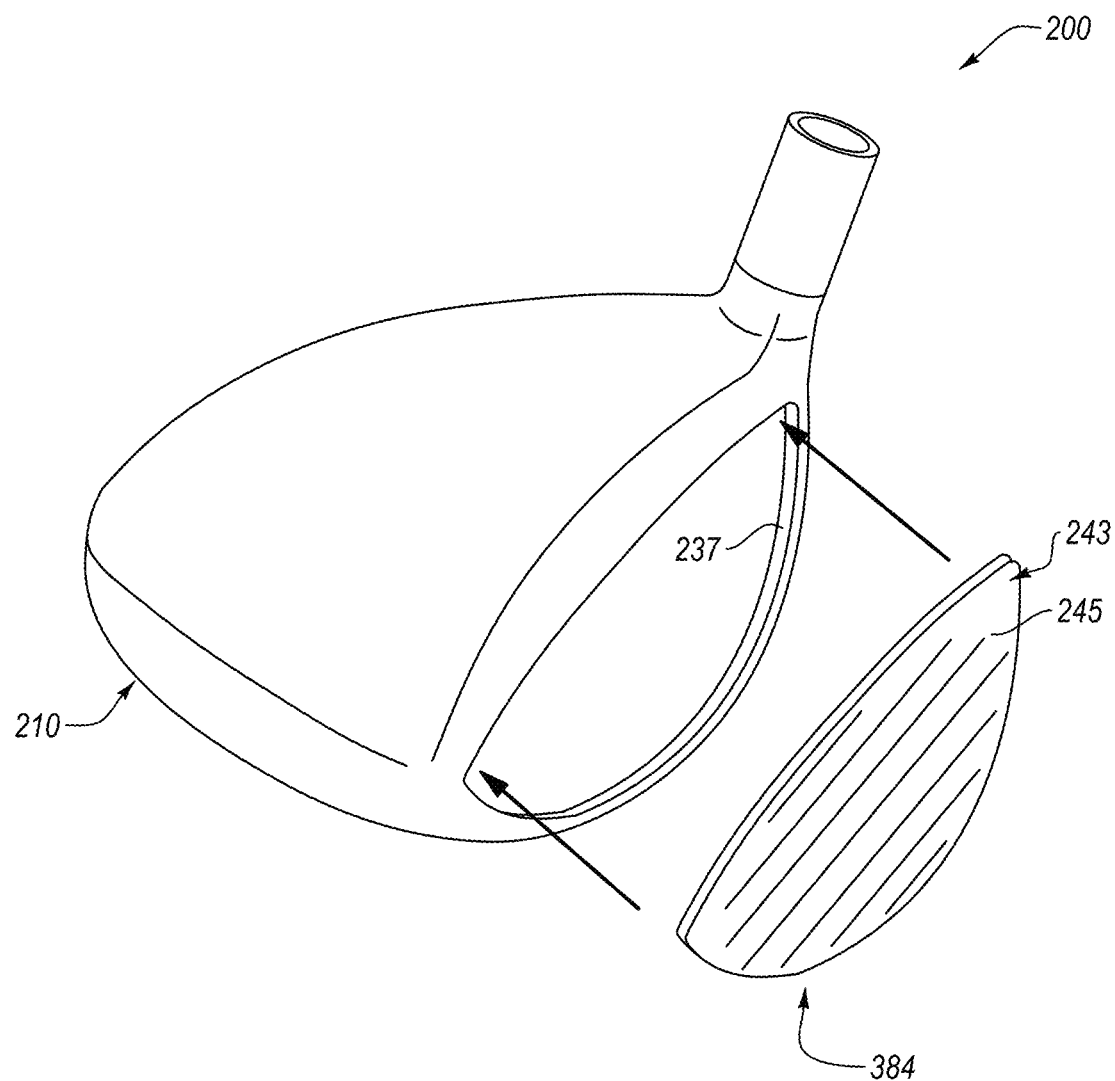
FIG. 28 is a schematic isotropic view of a golf club head, according to one or more examples of the present disclosure.

The cut laminated structure 384 is a strike plate of a golf club head, such as the strike plate 243 of the golf club head 200 of FIG. 28, in some examples. The golf club head 200 includes a body 210 that defines an opening 237. The strike plate 243 is attached (e.g., adhered) to the body 210 over the opening 237 to effectively close the opening 237. The strike plate 243 includes a strike face 245 configured to impact a golf ball during a proper golf shot. In such examples, the step of compressing the first panel 110 and the second panel 184, such as via a compression molding technique, can include shaping the strike plate 243 to incorporate various features into the strike plate 243, such as a desired bulge and roll radius and/or a twisted strike face.

The bulge and roll radius feature, which can be incorporated into the strike plate 243 when compression molded, can be similar to the bulge and roll radius features disclosed in U.S. Pat. No. 8,012,039, issued Sep. 6, 2011, which is incorporated herein by reference in its entirety.

The twisted strike face features, which can be incorporated into the strike plate 243, can be similar to the features of the strike face disclosed in U.S. Pat. No. 10,881,916, issued Jan. 5, 2021, which is incorporated herein by reference in its entirety. For example, the strike face 245 of the strike plate 243 can be twisted such that an upper toe portion of the strike face 245 is more open than a lower toe portion of the strike face 245, and such that a lower heel portion of the strike face 245 is more closed than an upper heel portion of the strike face 245. In certain examples, the golf club head 200 has a volume of 50 cubic centimeters (cc) to 500 cc, 390 cc to 490 cc, 100 cc to 430 cc, 100 cc to 400 cc, 100 cc to 350 cc, 100 cc to 300 cc, 100 cc to 299 cc, 100 cc to 250 cc, 100 cc to 200 cc, 140 cc to 160 cc, or 149 cc to 154 cc. In a particular example, the golf club head 200 has a volume of 456.6 cc. In particular examples, the strike face 245 and/or the golf club head 200 has a bulge curvature or radius of from 100 millimeters (mm) to 500 mm, 190 mm to 500 mm, 200 mm to 450 mm, 203 mm to 407 mm, 250 mm to 460 mm, 224 mm to 355 mm, 250 mm to 355, 203 mm to 305 mm, or 230 mm to 280 mm. In a particular example, the golf club head 200 has a bulge radius of 254 mm or 300 mm. In some examples, the strike face 245 and/or the golf club head 200 has a roll curvature radius of from 100 mm to 510 mm, 120 mm to 500 mm, 150 nm to 500 mm, 200 mm to 450 mm, 203 mm to 407 mm, 224 nm to 355 mm, 250 mm to 355, 203 mm to 305 mm, or 230 mm to 280 mm. In a particular example, the golf club head 200 has a roll radius of 254 nm or 300 nm. The above bulge radius and roll radius numbers can apply to golf club heads with a strike plate, made of a fiber-reinforced polymer, that has a "twisted" bulge radius and roll radius or without a twisted bulge radius and roll radius ("non-twisted").

In some examples, the cut laminated structure 384 is one of a crown insert, a sole insert, or other portion of a golf club head made of a fiber-reinforced polymer. Alternatively, according to certain examples, the cut laminated structure 384 forms at least part of a shaft of a golf club. Accordingly, the same process for making the strike plate 243 can be followed to make a crown insert or a sole insert of a golf club head, or a shaft of a golf club.

Although in some examples, the methods disclosed herein may be performed manually, in other examples, the methods are automated. As used herein, automated means operated at least partially by automatic equipment, such as computer-numerically-controlled (CNC) machines. In some examples, as shown in FIGS. 13, 14, and 25, the automated system 100 includes an electronic controller 103. The automatic equipment of the automated system 100, which, in certain examples, can include the edge-engagement tools, grippers, robotic arms, rotatable platforms, and other manufacturing tools disclosed herein, is controlled by the electronic controller 103, Moreover, any movement or operation of the features of the automated system 100 disclosed herein can be enabled by various movement-enabling automatic equipment, such as actuators (e.g., motors, cylinders, gears, rails, etc.), powered by electrical, pneumatic, magnetic, or hydraulic means.

The electronic controller 103 may be implemented as a hardware circuit comprising custom VLSI circuits or gate arrays, off-the-shelf semiconductors such as logic chips, transistors, or other discrete components. The electronic controller 103 may also be implemented in programmable hardware devices such as field programmable gate arrays, programmable array logic, programmable logic devices or the like.

The electronic controller 103 may also be implemented in code and/or software for execution by various types of processors. An identified module of code may, for instance, comprise one or more physical or logical blocks of executable code which may, for instance, be organized as an object, procedure, or function. Nevertheless, the executables of the electronic controller 103 need not be physically located together, but may comprise disparate instructions stored in different locations which, when joined logically together, comprise the electronic controller 103 and achieve the stated purpose for the electronic controller.

Indeed, code of the electronic controller 103 may be a single instruction, or many instructions, and may even be distributed over several different code segments, among different programs, and across several memory devices. Similarly, operational data may be identified and illustrated herein within the electronic controller 103, and may be embodied in any suitable form and organized within any suitable type of data structure. The operational data may be collected as a single data set, or may be distributed over different locations including over different computer readable storage devices. Where the electronic controller 103 or portions of the electronic controller are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the examples are described above with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. These code may be provided to a processor of the electronic controller 103, which can be a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A method of forming a laminated structure, the method comprising steps of:
   orienting a first panel and a backing layer secured to the first panel into a backing-separation orientation relative to an edge-engagement tool, wherein the first panel is made of an uncured pre-impregnated fiber-reinforced polymer and the backing layer is secured to a first-panel broad surface of the first panel via a backing-to-panel tack force between the backing layer and the uncured pre-impregnated fiber-reinforced polymer of the first panel;
   positioning the first panel into a backing-separation position relative to the edge-engagement tool;
   moving the edge-engagement tool, relative to the first panel and when the first panel is in the backing-separation orientation and the backing-separation position, so that backing-engagement features of the edge-engagement tool engage the backing layer, at only an edge portion of the backing layer, and just the edge portion of the backing layer separates from the first panel;
   stacking the first panel onto a second panel, made of the uncured pre-impregnated fiber-reinforced polymer, such that the first panel is secured directly to the second panel via a panel-to-panel tack force between the uncured pre-impregnated fiber reinforced polymer of the first panel and the uncured pre-impregnated fiber-reinforced polymer of the second panel, and the first panel and the second panel form the laminated structure;
   compressing together and heating the first panel and the second panel after the first panel is stacked onto the second panel such that the uncured pre-impregnated fiber-reinforced polymer is cured; and
   after the step of compressing and heating the first panel and the second panel, applying a primer layer onto an outer surface of one of the first panel or the second panel and applying ink onto the primer layer.

2. The method according to claim 1, further comprising removing the backing layer from the first-panel broad surface of the first panel after just the edge portion of the backing layer separates from the first panel, wherein the step of stacking the first panel onto the second panel comprises stacking the first panel onto the second panel such that the first-panel broad surface is secured directly to a second-panel broad surface of the second panel via the panel-to-panel tack force.

3. The method according to claim 1, wherein:
   each one of the first panel and the second panel comprises a plurality of plies in a stacked arrangement;
   each one of the plurality of plies of the first panel and the second panel comprises unidirectional fibers; and
   the plurality of plies of at least one of the first panel and the second panel consists of four plies including a first ply, where the unidirectional fibers are oriented at 0°, a second ply, where the unidirectional fibers are oriented at +45°, a third ply, where the unidirectional fibers are oriented at 90°, and a fourth ply, where the unidirectional fibers are oriented at −45°.

4. The method according to claim 1, wherein:
   each one of the first panel and the second panel comprises a plurality of plies in a stacked arrangement;
   each one of the plurality of plies of the first panel and the second panel comprises unidirectional fibers; and
   the plurality of plies of both the first panel and the second panel consists of four plies including a first ply, where the unidirectional fibers are oriented at 0°, a second ply, where the unidirectional fibers are oriented at +45°, a third ply, where the unidirectional fibers are oriented at 90°, and a fourth ply, where the unidirectional fibers are oriented at −45°.

5. The method according to claim 1, wherein:
each one of the first panel and the second panel comprises a plurality of plies in a stacked arrangement;
each one of the plurality of plies of the first panel and the second panel comprises unidirectional fibers; and
the plurality of plies of at least one of the first panel and the second panel consists of four plies each having unidirectional fibers oriented at 0°.

6. The method according to claim 1, further comprising a step of adjusting a distance, in a stacked direction that is perpendicular to the first-panel broad surface when the first panel is stacked onto the second panel, between the edge-engagement tool and the second panel prior to the step of moving the edge-engagement tool.

7. The method according to claim 1, wherein:
each one of the first panel and the second panel comprises a plurality of plies in a stacked arrangement; and
the method further comprises steps of:
ultrasonically cutting a sheet, made of the uncured pre-impregnated fiber-reinforced polymer, into the plurality of plies;
stacking a first set of the plurality of plies to form the first panel; and
stacking a second set of the plurality of plies to form the second panel.

8. The method according to claim 1, further comprising steps of:
roughening the outer surface of the one of the first panel or the second panel to form a roughened outer surface; and
cleaning the roughened outer surface to form a cleaned-roughened outer surface;
wherein the primer layer is applied onto the cleaned-roughened outer surface.

9. The method according to claim 1, further comprising a step of compression molding a polymeric layer onto the primer layer and over the ink to form a laminated structure.

10. The method according to claim 9, further comprising a step of cutting the laminated structure to form a cut laminated structure having a predefined shape.

11. The method according to claim 10, wherein the cut laminated structure is a strike plate of a golf club head.

12. The method according to claim 9, wherein:
each one of the first panel and the second panel comprises a plurality of plies in a first stacked arrangement;
the first panel and the second panel form part of the laminated structure;
the laminated structure comprises between, and inclusive of, 20 plies and 80 plies in a second stacked arrangement; and
each one of the plies of the laminated structure is made of a cured pre-impregnated fiber-reinforced polymer.

13. The method according to claim 12, wherein a thickness of each one of the plies of the laminated structure is such that a total thickness of the laminated structure is between, and inclusive of, 3 mm and 6.5 mm.

14. The method according to claim 13, wherein:
a bulge radius of the laminated structure is between, and inclusive of, 224 mm and 355 mm;
a roll radius of the laminated structure is between, and inclusive of, 224 mm and 355 mm; and
the method further comprises a step of attaching the laminated structure to a body of a golf club head having a volume of between, and inclusive of, 390 cubic centimeters (cc) and 490 cc.

15. The method according to claim 14, wherein the laminated structure comprises at least 60 plies in the second stacked arrangement.

16. The method according to claim 14, wherein the ink is applied onto the primer layer using at least one of a halftone printing technique, a relief printing technique, a thermal transfer printing technique, an inkjet printing technique, a single pass inkjet printing technique, and a pad printing technique.

17. The method according to claim 12, wherein the laminated structure is one of a crown insert or a sole insert of a golf club head.

18. The method according to claim 12, further comprising attaching the laminated structure to a body of a golf club head and over an opening formed in the body of the golf club head to close the opening.

19. The method according to claim 9, wherein the ink applied onto the primer layer forms indicia comprising at least one of alignment aids, color contrasts, or images.

20. A method of forming a laminated structure, the method comprising steps of:
orienting a first panel and a backing layer secured to the first panel into a backing-separation orientation relative to an edge-engagement tool, wherein the first panel is made of an uncured pre-impregnated fiber-reinforced polymer and the backing layer is secured to a first-panel broad surface of the first panel via a backing-to-panel tack force between the backing layer and the uncured pre-impregnated fiber-reinforced polymer of the first panel;
positioning the first panel into a backing-separation position relative to the edge-engagement tool;
moving the edge-engagement tool, relative to the first panel and when the first panel is in the backing-separation orientation and the backing-separation position, so that backing-engagement features of the edge-engagement tool engage the backing layer, at only an edge portion of the backing layer, and just the edge portion of the backing layer separates from the first panel;
stacking the first panel onto a second panel, made of the uncured pre-impregnated fiber-reinforced polymer, such that the first panel is secured directly to the second panel via a panel-to-panel tack force between the uncured pre-impregnated fiber reinforced polymer of the first panel and the uncured pre-impregnated fiber-reinforced polymer of the second panel, and the first panel and the second panel form the laminated structure, wherein each one of the first panel and the second panel comprises a plurality of plies in a stacked arrangement;
ultrasonically cutting a sheet, made of the uncured pre-impregnated fiber-reinforced polymer, into the plurality of plies;
stacking a first set of the plurality of plies to form the first panel; and
stacking a second set of the plurality of plies to form the second panel.

21. The method according to claim 20, further comprising steps of:
compressing together and heating the first panel and the second panel after the first panel is stacked onto the second panel such that the uncured pre-impregnated fiber-reinforced polymer is cured; and after the step of compressing and heating the first panel and the second panel, applying a primer layer onto an outer surface of one of the first panel or the second panel and applying ink onto the primer layer.

* * * * *